United States Patent
Yu

(10) Patent No.: US 6,961,348 B2
(45) Date of Patent: Nov. 1, 2005

(54) DATA TRANSMISSION APPARATUS AND METHOD FOR TRANSMITTING DATA BETWEEN PHYSICAL LAYER SIDE DEVICE AND NETWORK LAYER DEVICE

(75) Inventor: Shaohua Yu, Wuhan (CN)

(73) Assignee: Wuhan Research Institute of Post and Telecommunications, M.I.I., Province (CN)

( * ) Notice: Subject to any disclaimer, the term of this patent is extended or adjusted under 35 U.S.C. 154(b) by 909 days.

(21) Appl. No.: 09/804,144

(22) Filed: Mar. 13, 2001

(65) Prior Publication Data

US 2001/0012288 A1 Aug. 9, 2001

Related U.S. Application Data

(63) Continuation-in-part of application No. PCT/CN00/00195, filed on Jul. 13, 2000.

(30) Foreign Application Priority Data

Jul. 14, 1999  (CN) ..................................... 99116544 A

(51) Int. Cl.[7] .............................................. H04L 3/16
(52) U.S. Cl. ..................................................... 370/466
(58) Field of Search ............................... 370/355, 463, 370/465–469, 471, 395.51, 466, 393

(56) References Cited

U.S. PATENT DOCUMENTS

| | | | | |
|---|---|---|---|---|
| 5,323,392 A | * | 6/1994 | Ishii et al. | 370/466 |
| 6,097,720 A | * | 8/2000 | Araujo et al. | 370/355 |
| 6,188,699 B1 | * | 2/2001 | Lang et al. | 370/463 |
| 6,496,519 B1 | * | 12/2002 | Russell et al. | 370/465 |
| 6,584,118 B1 | * | 6/2003 | Russell et al. | 370/466 |
| 6,731,876 B1 | * | 5/2004 | Okamoto et al. | 398/75 |
| 2001/0043603 A1 | * | 11/2001 | Yu | 370/393 |

FOREIGN PATENT DOCUMENTS

| | | |
|---|---|---|
| JP | A-11004276 | 1/1999 |
| WO | WO-A-9904340 | 6/1999 |
| WO | WO-A-9952237 | 10/1999 |

OTHER PUBLICATIONS

Simpson, RFC 1662, dated Jul. 1994, pp. 1–19.*

* cited by examiner

*Primary Examiner*—Bob Phunkulh
*Assistant Examiner*—Robert W. Wilson
(74) *Attorney, Agent, or Firm*—Sughrue Mion, PLLC

(57) ABSTRACT

The present invention discloses a data transmission apparatus and method for transmitting data between physical layer side device and network layer device, which encapsulating a novel LAPS framing-de-framing into SPE/VC of a HDLC-like frame using a variable SAPI value. The LAPS encapsulation consists of the start Flag Sequence, address field (SAPI, Service Access Point Identifier), control field (0x03), Information field (Ipv4, Ipv6, or PPP protocol data unit), FCS (Frame check sequence) and the ending Flag Sequence, or consists of the start Flag, Address field, Control field, SAPI field (two octets), Information field, FCS field and the ending Flag Sequence. The Flag Sequence (0x7E) identifies the beginning/end of a LAPS frame. The present invention can be used to adapt Internet/Intranet to telecommunication infrastructure, and can be applied to network devices such as core and edge routers, switch devices, IP based network accessing equipment, line cards, and interfacing units used in high speed, e.g. Gigabit applications, for adapting IP directly to SDH/SONET or simplified SDH/SONET, or other physical layer devices.

87 Claims, 11 Drawing Sheets

DATA TRANSMISSION APPARATUS AND METHOD FOR TRANSMITTING DATA BETWEEN PHYSICAL LAYER SIDE DEVICE AND NETWORK LAYER DEVICE

This is a Continuation-in-Part of Application No. PCT/CN00/00195 filed Jul. 13, 2000, the disclosure of which is incorporated herein by reference.

FIELD OF THE INVENTION

The present invention relates to data networking and open system communications related to Internet/Intranet, and specifically, relates to a data transmission apparatus and method for transmitting data between physical layer side device and network layer device, such as core and edge routers, switch devices, IP based network accessing equipment, line cards, and interfacing units used in high speed, e.g. Gigabit applications, for adapting IP directly to SDH/SONET or simplified SDH/SONET, or other physical layer devices.

BACKGROUND ART

Currently data of Ipv4 is transported largely over telecommunications facilities or channels to support IP protocols and to provide IP-related applications. One of the best channels is SDH and related WDM(wavelength Division Multiplex) optical transport network are considered to be the foundation for the physical layer of the broadband IP and B-ISDN. SDH/SONET had been deployed all over the world in recent ten years.

ITU-T G.707 describes the advantages offered by SDH and multiplexing method, and specifies a set of SDH bit rates, the general principles and frame structure of the network node interface(NNI), the overall frame size of 9 rows by N*270 columns, the section overhead(SOH) together with its byte allocation, arrangements for international interconnection of synchronous transport modules (STMs), the formats for multiplexing and mapping elements into the STM-N at the NNI.

The North America equivalent of SDH is SONET. SONET is the U.S.(ANSI) standard for synchronous data transmission on optical media. People ensures standards so that digital networks can interconnnect internationally and that existing conventional transmission systems can take advantage of optical media through tributary attachments. SONET defines a base rate of 51.84 Mbps and a set of multiples of the base rate known as Optical Carrier Levels. The SONET is an octet-synchronous multiplex scheme that defines a family of standard rates and formats. Despite the name, it is not limited to optical links. Electrical specifications have been defined for single-mode fiber, multi-mode fiber, and CATV 75 ohm coaxial cable. The transmission rates are integral multiples of 51.840 Mbps, which may be used to carry T3/E3 bit-synchronous signals. It is also strong recommended to use G.703 E1/E3/E4/T1/E2/T4 interfaces as physical layer of IP-over-SDH/SONET. It is convenient user access way via LAN.

Both SDH and SONET provide standard for a number of line rates up to the maximum line rate of 9.953 gigabits per second(Gbps). Actual line rates approaching 20 gigabits per second are possible.

How to fully make use of these existing huge broadband resources effectively to provide Internet data communication services? How to combine IP-based network with SDH/SONET to establish the lower cost and high-speed based protocol model? RFC 2225(1998) defines an initial application of classical IP and ARP in an asynchronous Transfer Mode(ATM) network environment configured as a Logical IP Subnetwork(LIS), and considers only the application of ATM as a direct replacement for the "wires" and local LAN segments connecting IP end-stations("Member") and routers operating in the "classical" LAN-based paradigm. RFC 1619(1994) describes the use of PPP over SONET and SDH circuits. PPP(RFC 1548, 1993) was designed as a standard method of communicating over point-to-point links. Initial deployment has been over short local lines, leased lines, and plain-old-telephone-service (POTS) using modems. As new packet services and higher speed lines are introduced, RFC 1717(1994) proposes a method for splitting, recombining and sequencing datagram across multiple logical data links.

The rapid growth of Internet/Intranet has led to a need to establish a framework of telecom Intranet/Intranet (e.g. QoS, priority, account management), meanwhile, it is necessary and also very important to think about the requirement for compatibility with the current Internet protocol (Ipv4) at other Internet/Intranet areas and next generation Internet protocol(Ipv6).

Currently, the method for adapting IP to SDH/SONET is PPP (including LCP and NCP) over HDLC of RFC 2615 protocol, which includes RFC 1661, RFC 1662, RFC 1570, RFC 1547, RFC 1340. PPP can encapsulate more than 30 network protocols, including Ipv4. However, PPP was originally proposed for inter-protocol adaptation for Modem dial-up(firewall), the algorithm for PPP is complicated.

When applying PPP over SONET or SDH, there exist the following defects:

(1) no standard supports for lower level virtual container applications, which results in IP over SDH/SONET can not be applied to Internet edge access;

(2) for 2.5 Gbps rate or up, the overhead of hardware forwarding engine is too heavy, especially for IP over WDM using simplified SDH/SONET frame, since in RFC 1619, LCP and Magic Number are recommended, both of which are very complicated;

(3) in case the RFC 1619 is used, the default value of the retransmit timer is 3 second in PPP, which is too slow for high speed link. For specific engineering applications, it is required to support all the rate range from 2M bit to 10000M bit/sec(change about 4032 times), therefore the value of the retransmit timer should be determined based on the round-trip delay along the line. However, it is not defined in RFC 1619, causing uncertainty when interconnecting equipment from different vendors;

(4) The padding field of PPP is almost not used in the case of IP over SDH/SONET, but it still kept now in RFC 2615. In addition, this padding field requires a function at the receiver side to distinguish between information field and padding field which would have been defined in RFC standard, and at the same time which in turn increases the processing overhead;

(5) LCP contains 10 configuration packets, 16 events and 12 actions, and more than 130 protocol states, which is difficult and costly to implement for optical packet exchange. For illustrating the above, Table 1 show the list of Events and Actions using the conventional PPP over SONET/SDH standard on finite-state machine of LCP.

(6) Due to the introduction of PPP, the minimum packet size linked between two routers is reduced from (about) 40 bytes for Ipv4 to (about) 10 bytes for PPP. The ratio of MPS/mPS is increased from 1600/40(=40), to 1600/10(= 160), i.e. the span of a packet (prescribed as the ratio of MPS/mPS) is increased by 4 times. Consequently, it becomes more difficult for the router to perform synchronous processing and forwarding of cell based or packet based for locating small packets(e.g. 64 bytes) based on cell or equal size, which results in significant degradation of networking performance, such as packet loss rate, time delay, trembling of time delay, etc.

TABLE 1

The list of Events and Actions

| Events | | Actions | |
| --- | --- | --- | --- |
| Up | = lower layer is Up | tlu | = This-Layer-Up |
| Down | = lower layer is Down | tld | = This-Layer-Down |
| Open | = administrative Open | tls | = This-Layer-Started |
| Close | = administrative Close | tlf | = This-Layer-Finished |
| TO+ | = Timeout with counter>0 | irc | = Initialize-Restart-Count |
| TO− | = Timeout with counter expired | zrc | = Zero-Restart-Count |
| RCR+ | = Receive-Configure-Request (Good) | scr | = Send-Configure-Request |
| RCR− | = Receive-Configure-Request (Bad) | | |
| RCA | = Receive-Configure-Ack | sca | = Send-Configure-Ack |
| RCN | = Receive-Configure-Nak/Rej | scn | = Send-Configure-Nak/Rej |
| RTR | = Receive-Terminate-Request | str | = Send-Terminate-Request |
| RTA | = Receive-Terminate-Ack | sta | = Send-Terminate-Ack |
| RUC | = Receive-Unknown-Code | scj | = Send-Code-Reject |
| RXJ+ | = Receive-Code-Reject (permitted) or Receive-Protocol-Reject | | |
| RXJ− | = Receive-Code-Reject (catastrophic) or Receive-Protocol-Reject | | |
| RXR | = Receive-Echo-Request or Receive-Echo-Reply or Receive-Discard-Request | ser | = Send-Echo-Reply |

For exemplary purpose, FIG. 1 illustrates the line card structure in a conventional PPP over SDH router. As shown in FIG. 1, as components of a router 1, there are a plurality of line cards 2-1, . . . 2-N, each of which is connected to a switch fabric unit 3. For each of the line cards, the HDLC-like data frames from O/E module 5 are received by an OC-192c/48c/12c/3c or STM-64c/16c/4c/1 transceiver 6 and transmitted to a POS(PPP over SDH/SONET) mapper/demapper 7 (which is also called Framer/De-framer). In the POS Framer/Deframer 7, the PPP frames encapsulated in the HDLC frames are extracted out and transmitted to a packet forwarding engine 8, which operates in cooperation with a routing engine 4, for PPP processing. The routing engine 4 is a software executed by a global embedded CPU in the router. The forwarding engine 8 forwards the data packets to the switch fabric unit 3 by using a mechanism of combining IP address subset of routing table or forwarding information base to line card identifier, so as to send the data packets to the destination thereof. PPP functions are implemented in the forwarding engine and the routing engine, which is for network layer (IP) processing, in each of the line cards inside the router.

FIG. 2 illustrates one implementation of the PPP processing in the network layer in a conventional line card. Here the data rate is supposed to be 2.5 G bit/s, for example. In FIG. 2, the filter function of PPP(LCP, NCP) can be implemented in hardware, such as a FPGA(field programmable gate array) with about more than 50,000 gates, as the forwarding engine, while the other LCP functions are implemented in form of software, as the routing engine. Or alternatively, all the PPP, LCP, NCP functions can be implemented in hardware as the forwarding engine, which can be a FPGA with about more than 500,000 gates. In addition, a PPP software can have up to 10,000 lines of C codes, and cost up to tens of thousand USD.

In connection with the complexity of Mapper/Demapper chips and Network processing engine chips in the line cards (see FIG. 1), having investigated Mapper/Demapper chips solution of several vendors, the inventor found already:

When configured for POS mode, the transmit HDLC processor of Mapper/Demapper provides the insertion of HDLC frame into the SPE, It will perform packet framing, inter-frame fill and transmit FIFO error recovery. In addition, it optionally performs scrambling ($X^{43}+1$), either pre or post HDLC processor, perform transparency processing specified in RFC 1662 and will optionally generate a 16/32 bit FCS.

The receive HDLC processor provides for the extraction of HDLC frame, transparency removal, de-scrambling (if enable), FCS error checking, and optional delete the HDLC address and control fields. The function of LCP and NCP are not covered in Mapper/Demapper chips.

POS PHY interfaces have been defined as 8 bit parallel 25 Mbps for OC-3/STM-1, 16 bit parallel 50 Mbps for OC-12/STM-4, and 32 bit parallel 100 Mbps or 64 bit parallel for OC-48/STM-16.

The handling of different LCP packets of PPP, the processing of link establishment, Authentication, Network-Layer Protocol phase and Link Termination, the forming of State Transition Table, will be implemented either in network processor engine or in global routing engine transferred from network processor. Many vendors, i.e. Agere, Broadcom, Conexant, C-port, IBM, Intel, Lucent, Maker, MMC network, Motorola, Sitera, softcom, TI and Vitesse (some European, Japanese and Chinese companies are also included) are developing network processor engine of either packet-based or cell-based or both packet and cell based. For example, the network processor of some company will be released or is available now, it has more than 800 pins of BGA package, and associated a set of software development and testing tools are also needed for building of line cards. This engine has multi-protocol processor and are complicated very much, although many necessary functions of this engine are involved in IP-based forwarding, such as input stream scheduler, receive stream parse, look-up and update, receive editor, input queue manager, output queue manager, transmit editor, output stream scheduler, interface to SSRAM, SDRAM and SNMP network management and so on. The programming of microcode based or lower-layer classification based language is usually used up to now. The next objective is to build a pure ASIC so as to implement IP-forwarding. In these two case above, it means the use of LCP and NCP protocol functions means that this engine is added a' n extra burden, since the wired-speed forwarding of IP-based is still basic requirement. It can be believed that there is no problem to build all functions including these PPP mechanism (i.e. Nexabit has implemented PPP over OC-192 between Chicago and Cleveland), even if the situation is complicated further ten times than ever before. But main point to reduce cost, raise efficiency can not be obtained from the conventional design.

It can be seen that the conventional PPP over SDH/SONET solution is complex, difficult and expensive to implement, slow, and not suitable for high speed data transmission, especially for gigabit rate applications.

SUMMARY OF THE INVENTION

The object of the present invention is to provide a data transmission apparatus between physical layer and network layer, which is simple, efficient, reliable, low cost and suitable for high speed data transmission applications, such as routers with giga bit rate or up, and routers at edge network nodes.

Another object of the present invention is to provide a data transmission apparatus between physical layer and network layer, which is better adapted to 32-bit based Ipv4, Ipv6 data from Internet.

In transmitting direction, the present invention provides a data transmission apparatus for transmitting data packets from a network layer side device and a physical layer side device, comprising: a first receiving means for receiving the data packets of a certain type from the network layer side device; SAPI identifier generating means for recognizing the type of the data packets and generating a SAPI identifier according to the recognized type; first framing means for encapsulating a SAPI field including said SAPI identifier and an information field including said data packets into a frame, to form a first type of frames; second framing means for encapsulating said first type of frames into a payload portion, inserting appropriate overheads, to form a second type of frames; a first transmitting means for outputting said second type of frames to the physical layer side device. According to one aspect of the invention, said first framing means encapsulates said data in a format of start flag, SAPI field including said SAPI identifier as address field, control field, information field including said data packets, FCS field, and end flag to form the first type of frames. According to another aspect of the invention, said first framing means encapsulates said data in a format of start flag, address field, control field, SAPI field including said SAPI identifier, information field including said upper layer data packets, FCS field, and end flag to form the first type of frames.

In receiving direction, the present invention further provides a data transmission apparatus for transmitting data packets formed by encapsulating a first type of frames in a second type of frames as payload with appropriate overheads, from a physical layer side device to a network layer side device, each of said first type of frames including a SAPI field, and an information field, said apparatus comprising: a second receiving means for receiving the data packets from the physical layer side device; a second de-framing means for removing the overheads, and extracting the first type of frames from the payload of the second type of frames; a first de-framing means for extracting the SAPI field and the data contained in the information field from the first type of frames; determining means for comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and a second transmitting means for transmitting the extracted data packets and the determining result to the network layer side device. According to one aspect of the invention, said first type of frames include start flag, SAPI field including said SAPI identifier as address field, control field, information field including said data packets, FCS field, and end flag to form the first type of frames. According to another aspect of the invention, said first type of frames include start flag, address field, control field, SAPI field including said SAPI identifier, information field including said data packets, FCS field, and end flag to form the first type of frames.

The present invention further provides a data transmission apparatus for transmitting data packets between a network layer side device and a physical layer side device comprising the data transmission apparatus incorporating the above two data transmission in both transmitting and receiving directions.

The present invention further provides a router device comprising a plurality of line cards, and at least one of line cards includes the above two data transmission in both transmitting and receiving directions.

The present invention further provides a data transmission method for transmitting data packets from a network layer side device and a physical layer side device, comprising the steps of: receiving the data packets of a certain type from the network layer side device; recognizing the type of the data packets and generating a SAPI identifier according to the recognized type; first framing step, for encapsulating a SAPI field including said SAPI identifier and an information field including said data packets into a frame, to form a first type of frames; second framing step, for encapsulating said first type of frames into a payload portion, inserting appropriate overheads, to form a second type of frames; and outputting said second type of frames to the physical layer side device. According to one aspect of the invention, said first framing step encapsulates said data in a format of start flag, SAPI field including said SAPI identifier as address field, control field, information field including said data packets, FCS field, and end flag to form the first type of frames. According to another aspect of the invention, said first framing step encapsulates said data in a format of start flag, address field, control field, SAPI field including said SAPI identifier, information field including said data packets, FCS field, and end flag to form the first type of frames.

The present invention further provides a data transmission method for transmitting data packets formed by encapsulating a first type of frames in a second type of frames as payload with appropriate overheads, from a physical layer side device to a network layer side device, each of said first type of frames including a SAPI field, and an information field, said method comprising the steps of: receiving the data packets from the physical layer side device; second de-framing step, for removing the overheads, and extracting the first type of frames from the payload of the second type of frames, first de-framing step, for extracting the SAPI field and the data contained in the information field from the first type of frames; comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and transmitting the extracted data packets and the determining result to the network layer side device. According to one aspect of the invention, said first type of frames include start flag, SAPI field including said SAPI identifier as address field, control field, information field including said data packets, FCS field, and end flag to form the first type of frames. According to another aspect of the invention, said first type of frames include start flag, address field, control field, SAPI field including said SAPI identifier, information field including said data packets, FCS field, and end flag to form the first type of frames.

The data transmission apparatuses and methods of the present invention can be applied to core and edge routers, switch devices, IP based network accessing equipment, line cards, and interfacing units, etc.

BRIEF DESCRIPTION OF THE DRAWINGS

The present invention is illustrated by way of example and not limited by the figures of the accompanying drawings, in which like references indicate similar elements and in which.

DETAILED DESCRIPTION OF THE PREFERRED EMBODIMENTS

The present invention removes the PPP processing such as the filter function from the network layer processor, and accommodate multiple logical links with a Service Access Point Identifier(SAPI) to encapsulate multiple type of data, such as: Ipv6-based, Ipv4-based and other network protocol packets.

Figure 1:
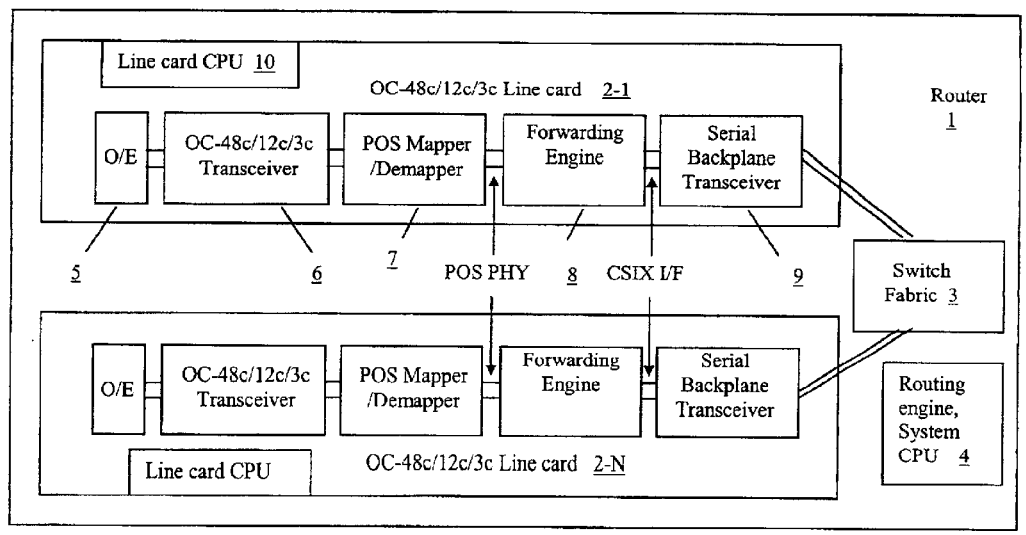
FIG. 1 illustrates the line card structure in a conventional PPP over SDH router.
Figure 2:
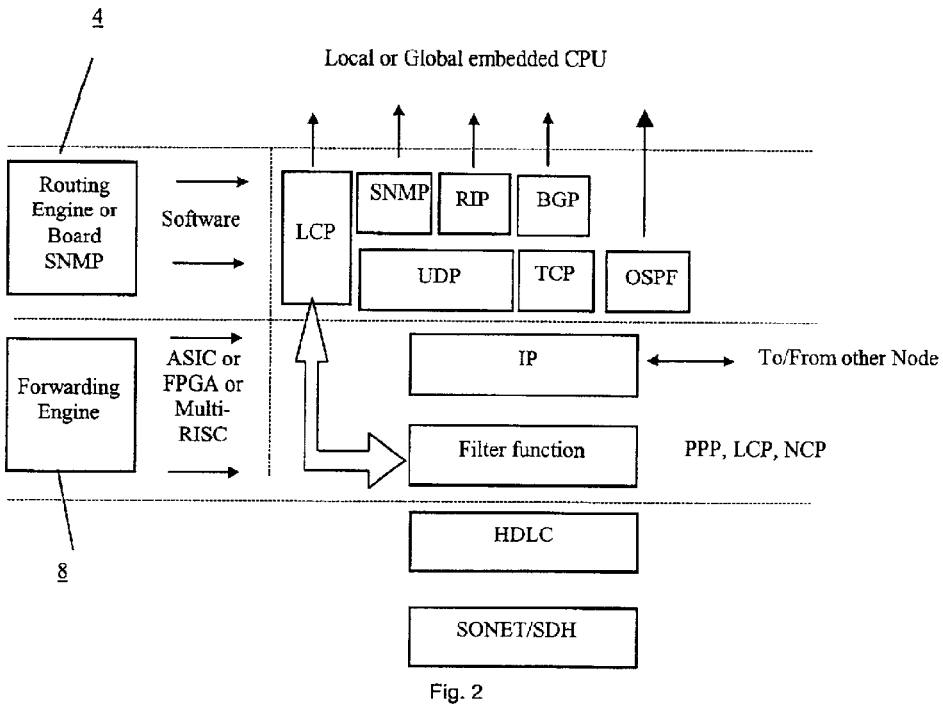
FIG. 2 illustrates one implementations of the PPP processing in the network layer in a conventional line card.
Figure 3A:
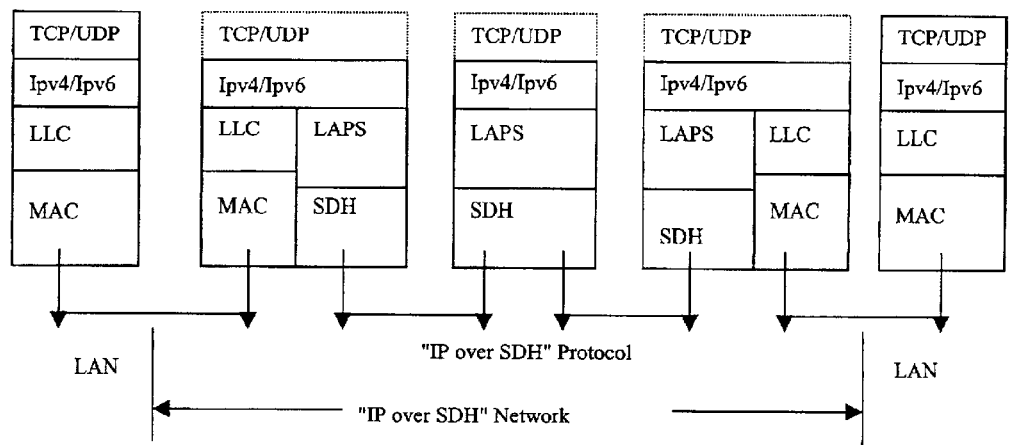
FIG. 3A is an example of the configuration of the protocol stack for networking according to the present invention.

IP over SDH using LAPS is a type of data communication architecture of combination Internet protocol with SDH network. FIG. 3A is an example of the configuration of the protocol stack for networking according to the present invention, which shows the protocol stack configuration at the nodes of the input side and the output side when connecting a LAN (local area network) to a IP over SDH network. As shown in FIG. 3A, IP over SDH represents the inter-connection of IP with SDH. At the gateway, physical interfaces of both SDH and MAC are provided, while the network layer is Ipv4/Ipv6.

Figure 3B:
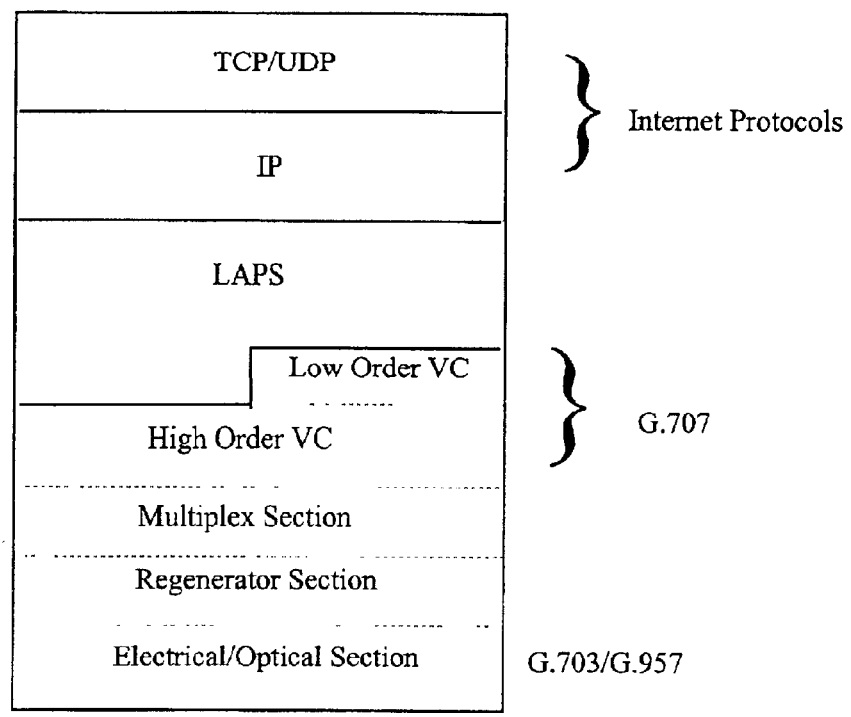
FIG. 3B illustrates Layer/Protocol Stack for IP over STM-N using LAPS according to the present invention.
Figure 3C:
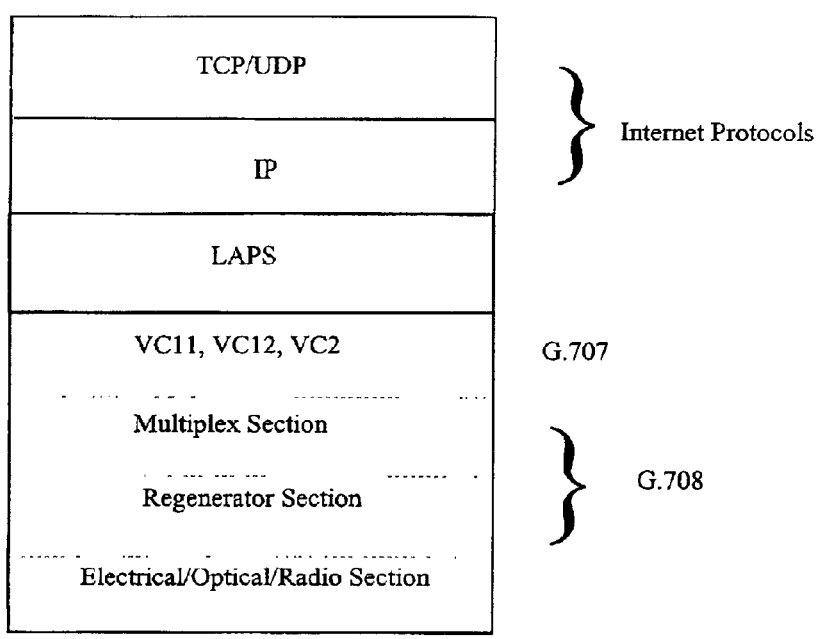
FIG. 3C illustrates Layer/Protocol Stack for IP over sSTM using LAPS according to the present invention.

The physical, link and network layer are specified as SDH/SONET, LAPS and Ipv4/Ipv6/PPP/IS-IS (Intermediate System) respectively as the layer/protocol stack for IP over STM-N in FIG. 3A, and the layer/protocol stack for IP over sSTM-n in FIG. 3B.

FIG. 3A illustrates Layer/Protocol Stack for IP over STM-N using LAPS according to the present invention. As shown in FIG. 3A, with LAPS, there are two methods for putting into virtual container: one is to put the LAPS frame in the low level virtual container, then multiplex the low level VCs into high level VCs using octet interleaving according to the multiplex structure of SDH, and transmit in the sequence of Multiplex section, Regenerator section, and O/E transmission section, while extracting the LAPS frames in reverse sequence at the receive side; the other method is to put the LAPS frames into SPE which is mapped in the high level container directly, and then transmit in the sequence of Multiplex section, Regenerator section, and O/E transmission section, while extracting the LAPS frames in reverse sequence at the receive side.

FIG. 3B illustrates Layer/Protocol Stack for IP over sSTM using LAPS according to the present invention. As shown in FIG. 3B, only the LAPS frames are put into low level VCx(VC11, VC12, VC2), and then multiplex the low level VCs into sub-category multiplex section using octet interleaving according to the sub-category multiplex structure of SDH, and transmit in the sequence of Multiplex section, Re generator section, and O/E transmission section, while extracting the LAPS frames in reverse sequence at the receive side.

Figure 4:
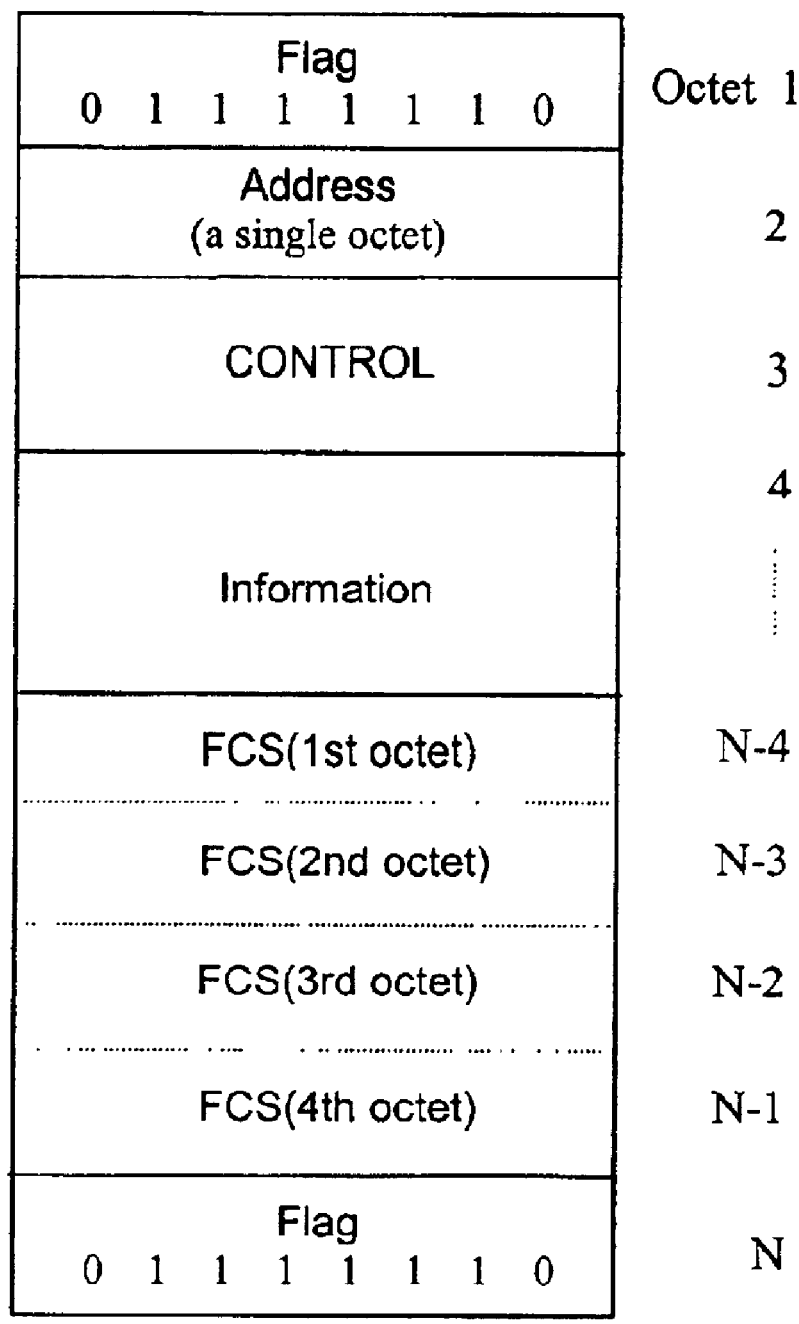
FIG. 4 illustrates the LAPS frame format according to a first embodiment of the present invention.

FIG. 4 illustrates one example of the LAPS frame format according to the present invention. As shown in FIG. 4, the LAPS encapsulation consists of the start Flag Sequence, address field (SAPI, Service Access Point Identifier)(one single octet), control field (0x03), Information field (Ipv4, Ipv6, or PPP protocol data unit), FCS (Frame check sequence) and the ending Flag Sequence. The Flag Sequence (0x7E) identifies the beginning/end of a LAPS frame.

Figure 12:
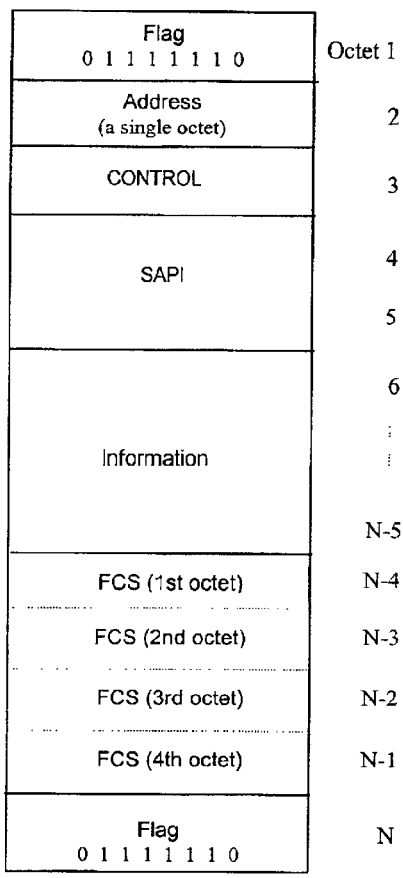
FIG. 12 illustrates the LAPS frame format according to the second embodiment of the present invention.

FIG. 12 illustrates another example of the LAPS frame format according to the present invention. As shown in FIG. 12, the LAPS encapsulation consists of the start Flag Sequence, address field (one single octet), control field (0x03), SAPI field(SAPI, Service Access Point Identifier, two octets), Information field (Ipv4, Ipv6, or PPP protocol data unit), FCS (Frame check sequence) and the ending Flag Sequence. The Flag Sequence (0x7E) identifies the beginning/end of a LAPS frame. In stead of placing the SAPI field in the address field as that in FIG. 4, the format in FIG. 12 uses a separate SAPI field following the control field, and the address field will have its own usage, as will be described below.

Figure 5A:
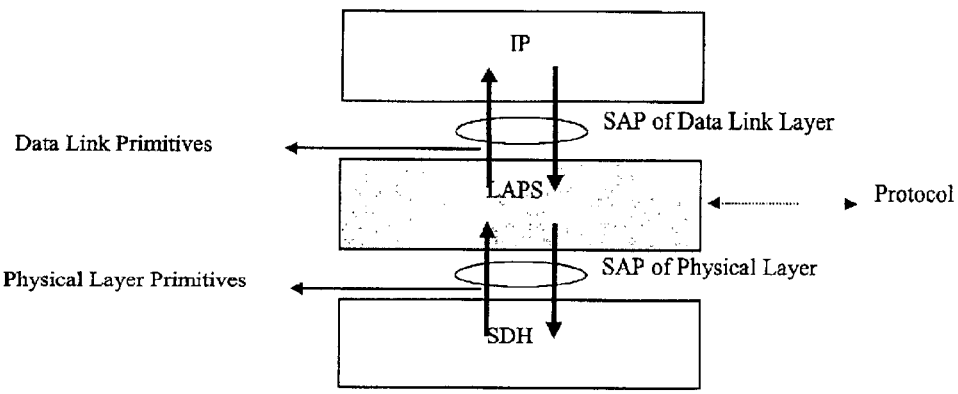
FIG. 5A, 5B illustrate the primitive relationship between the network layer, link layer and physical layer.
Figure 5:
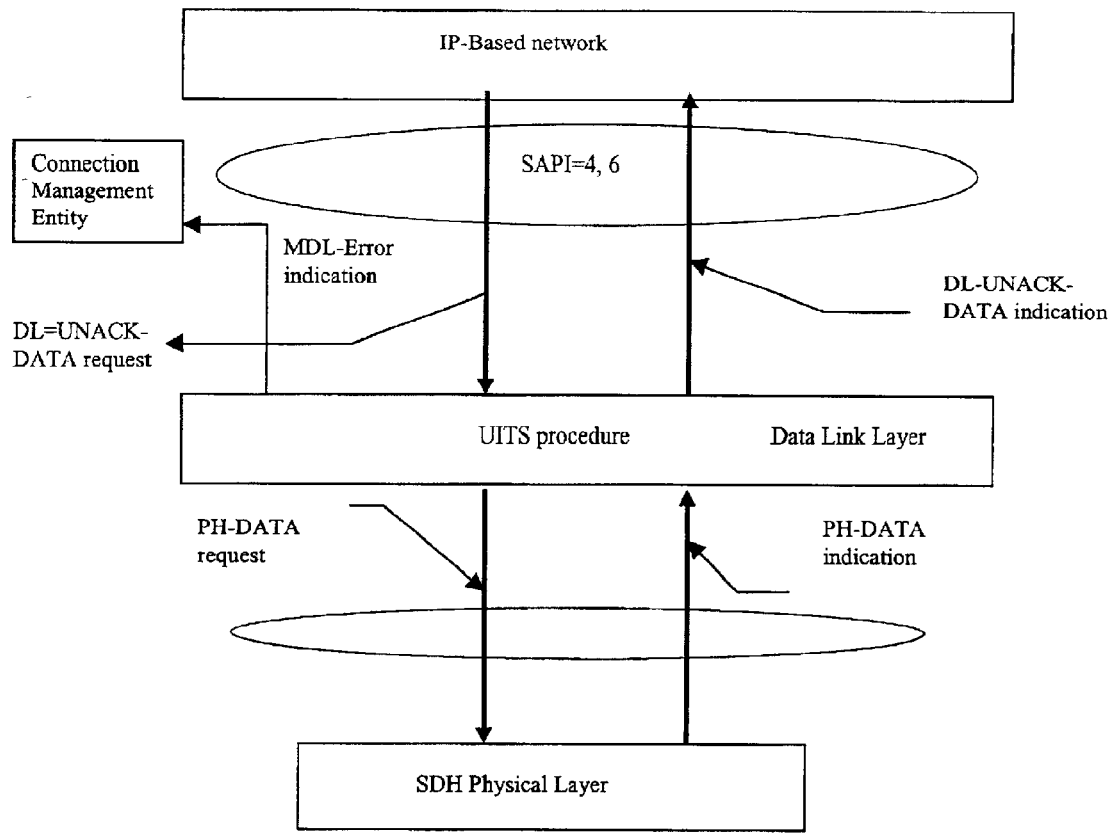

FIG. 5A, 5B illustrates the primitive relationship between LAPS of the invention and IP, LAPS and SDH. Communications between layer are accomplished by means of primitives. Primitives represent, in an abstract way, the logical exchange of information and control between the data link and layer 3 or other upper protocols. They do not specify or constrain implementations. As shown in FIG. 5B, the DL-UNACK-DATA(request and indication) primitives are used to request and indicate layer 3 IP packets(User data) or user data of other upper protocols which are to be transmitted, or have been received, by the data link layer entity using the UITS. The PH-DATA primitives are used to request and indicate data link frames used for data link layer peer-to-peer communications passed to and from the physical layer.

The MDL-ERROR primitives are used to indicate the connection management entity that an error has occurred as a result of communication with the data link layer peer entity. The actions to be taken by the connection management entity on receipt of a MDL-ERROR indication primitive. The parameter is associated with a primitive and contains information related to the service. In the case of the DATA primitives, the parameter data contains the Service Data Unit that allows the service user to transmit its Ptotocol data Unit to the Peer service user entity. For example, the DL-UNACK-DATA parameter contains layer 3 information. The PH_DATA parameter contains the data link layer frame. For example, there are User data and 6-bits DS codepoint for differentiated services.

Primitive procedures specify the interactions between adjacent layers to invoke and provide a service. The service primitives represent the elements of the procedures, as shown in FIG. 5B.

Figure 6:
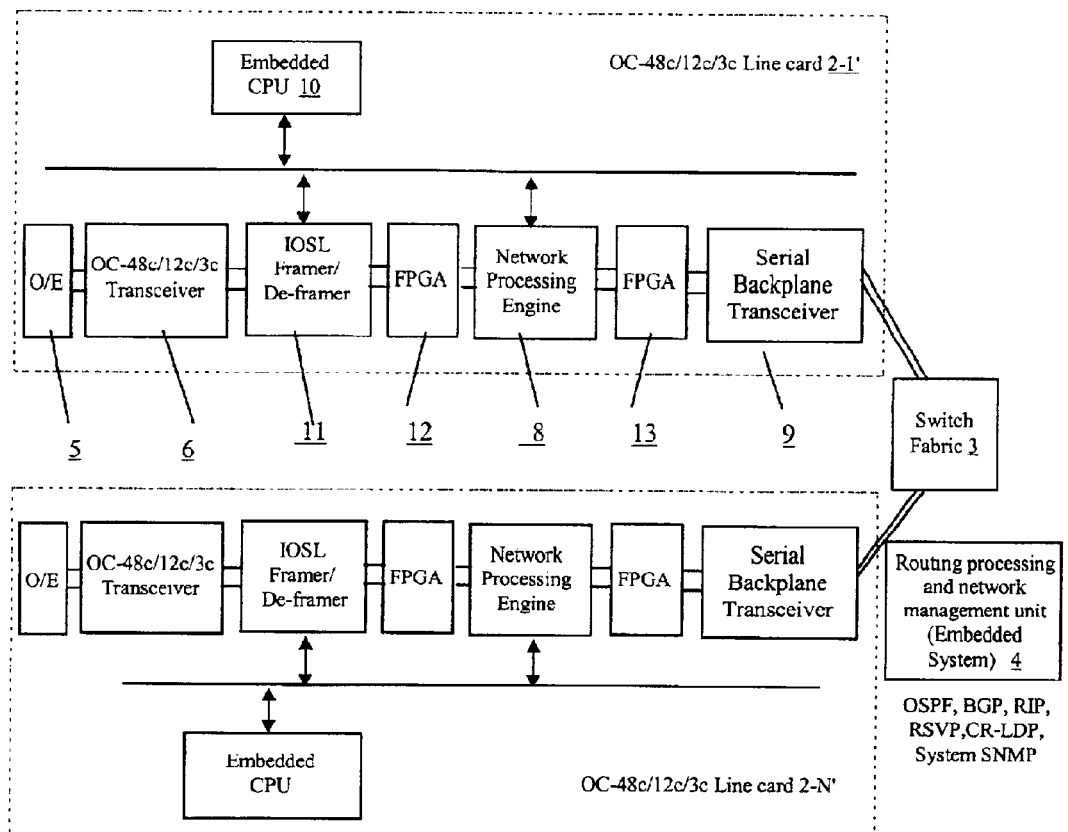
FIG. 6 illustrates architecture of a router of IP over SDH using LAPS according to one embodiment of the present invention.

FIG. 6 illustrates the architecture of the line card structure in a router(not shown) of IP over SDH using LAPS (hereinafter referred as IOSL) according to one embodiment of the present invention. As shown in FIG. 6, the router comprises a plurality of line cards 2-1' . . . 2-N', each of which is interfaced to a certain network nodes; a switch fabric unit 3 for exchanging data packets among the line cards; routing processing and network management unit 4 for performing routing processing and necessary network management processing, such as OSPF, BGPv4, RIPv1/v2, RSVP, CR-LDP. System SNMP. Each of the line cards comprises a O/E module 5 for interfacing to physical layer devices; a OC type transceiver 6 for receiving/transmitting data from/to the O/E module; a IOSL framer/de-framer 11 for performing LAPS framing/de-framing process; a FPGA or software code in network processor 12 for standard/rate adaptation; a network processing engine 8 for forwarding IP packets to their destination nodes according to the recipient IP address thereof; a FPGA 13 for standard/rate adaptation; a serial backplane transceiver 9 for receiving/transmitting data from/to the switch fabric unit 3.

In FIG. 6, O/E is the optical/electrical module 5 with OC3/12/48/192 rates. The transceiver 6 OC-3/12/48/192 is a SONET/SDH compatible chips with integrated clock generator for use in SONET/SDH systems operating at a 2.488 Gb/s data rate. A internal clock generator uses a phase locked loop to multiply either a 77.76 MHz or 155.52 MHz reference clock in order to provide the 2.488 GHz clock for internal logic and output re-timing. A 8/16/32/64 bit parallel interface incorporates an on-board FIFO eliminating loop timing design issues by providing a flexible parallel timing architecture. In addition, the device provides both facility and equipment loopback modes and two loop timing modes.

In FIG. 6, IOSL(IP over SDH/SONET using LAPS) Framer/Deframer performs the following functions:

Encapsulates Ipv4, Ipv6, PPP, IS-IS, and Ethernet based packets into LAPS information field identified by SAPI.

The parameter "6-bits DS codepoint"(defined in RFC 2460) of LAPS may be used to perform some link functions between IPv4/IPV6 and LAPS or between IPv4/IPv6 and PPP to provide the support of the differentiated services; it shall not be used into any frame of LAPS. The DS codepoint is extracted from the IP data, and put into the information field to control the queue algorithm.

Handles the source and sink of SONET/SDH section, line, and path layers, with transport/section E1, E2, F1 and D1–D12 overhead interfaces in both transmit and receive directions;

Implement the Processing of STS-192/STM-64, or STS-48c/STM-16 or STS-12c/STM-4 or STS-3c/STM-1 data streams with fill duplex mapping of LAPS frame into SONET/SDH payloads;

Self-synchronous scrambler/Descrambler implementing $(X^{43}+1)$ polynomial for LAPS.

Provides an POS Phy interface or Utopia interface.

Supplies 8-bit or 16-bit microprocessor interface used into control, configuration, and status monitoring.

LAPS processing compliant with ITU-T Recommendation X.85.

Compliant with SONET/SDH specifications ANSI T1.105, Bellcore GR-253-CORE and ITU G.707(version of April, 2000).

Provides IEEE 1149.1 JTAG test port.

Supports internal loopback paths for diagnostics.

In the above IOSL framer/de-framer, in the direction of transmit, the following basic functions are included: insertion of LAPS frame into the SPE Framing; inter-frame fill and transmit FIFO error recovery; scrambling $(X^{43}+1)$; transparency processing; generate a 32 bit FCS.

In the direction of receive, the basic functions are as follows: extraction of LAPS frame; transparency removal; de-scrambling (if enable); FCS error checking; delete the LAPS address and control fields.

Figure 7:
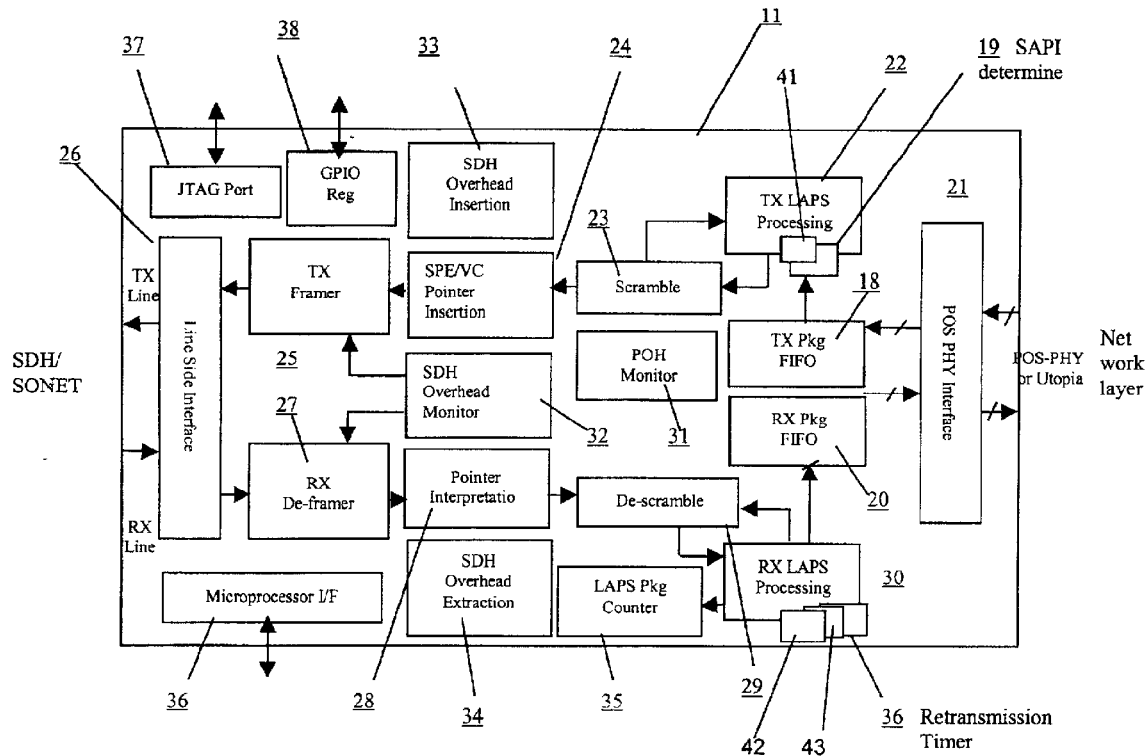
FIG. 7 illustrates the structure of the IOSL framer/deframer according to the first and second embodiments of the present invention.

The detailed structure of the IOSL framer/deframer in FIG. 6 according to a first embodiment and a second embodiment of the invention is shown in FIG. 7. The Framer/de-framer performs standard STS-3c/STM-1 processing for both the transmit and receive directions.

In the transmit direction, the LAPS frames are encapsulated into the SONET/SDH SPE/VC. The POH and TOH/SOH are inserted, and the resulting STS signal is transmitted in byte wide format to a parallel/serial converter and then to a Fiber Optic transceiver. As shown in FIG. 7, according to the first embodiment of the invention, the IOSL framer/deframer comprises: in the transmitting direction, a TX FIFO 18 for receiving and buffering data packets from a network layer side device, for example, IP packets in conformity with Ipv4 or Ipv6, or PPP packets, or IS-IS, or other; a SAPI determining unit 19 for determining the type of the received data packets and generating a corresponding predetermined SAPI value; TX LAPS processing unit 22 for encapsulating the SAPI and data packets into LAPS frames, according to the format shown in FIG. 4; a scrambling unit 23 for LAPS frame; a SPE/VC pointer adjustment unit for adjusting pointer which indicating the location of the SPE/VC4; a SDH overhead insertion unit 33 for inserting appropriate overheads; a TX SDH/SONET framer 25 for encapsulating the scrambled LAPS frames into SPE/VC4 of SDH/SONET frames to form SDH/SONET frames; a line interface 26 for transmitting the SDH/SONET frames via TX lines to physical layer device, such as the O/E module in FIG. 6.

As shown in FIG. 7, according to the second embodiment of the present invention, the structure of the IOSL framer/ deframer is almost the same as that of the first embodiment. The difference is the LAPS format to be processed. The TX LAPS processing unit 22 according to the second embodiment, encapsulates the SAPI and data packets into LAPS frames according to the format shown in FIG. 12, that is, in the format of start flag, address field, control field, SAPI field including said SAPI identifier, information field including said data packets, FCS field, and end flag to form the LAPS frames.

As shown in FIG. 7, according to the second embodiment, the TX LAPS processing unit 22 may include a frame type indicator generating means 41 for generating an indicator which indicates the type of said first type of frames, and said frame type indicator is inserted in the address field during LAPS framing process. Said frame type indicator is set to "0x04" for LAPS frames, and "0xff" for PPP frames, and the other values are reserved for other types of frames, or for use of future frame formats. Specifically, for Ipv4 data packets, the frame type indicator in the address field is "0x04" (one single octet), the control octet is "0x03" (by default), and the SAPI identifier in the SAPI field is "0x0021" (two octets); for Ipv6 data packets, the SAPI field is changed to "0x0057"; and for PPP packets or PPP/HDLC solution, the frame type indicator in the address field is "0xff" (one single octet), the control octet is "0x03" (by default), and the SAPI identifier in the SAPI field is "0x0021" (two octets).

The above frame type indicator generating means 41 can be provided either separately, or be incorporated into the SAPI determining means 19 to form a single unit. In the receiving direction, the process is reversed. The byte wide STS signal is received, the IOSL framer/de-framer 11 locates the frame and TOH/SOH, interprets the pointer, terminates the TOH/SOH and POH, extracts the SPE/VC4, and then extracts the LAPS frames from the SPE/VC4 payload. The SONET/SDH processor consists of a Receive SONET/SDH Processor and a Transmit SONET/SDH processor. As shown in FIG. 7, according to the first embodiment and the second embodiment of the invention, the IOSL framer/de-framer comprises: the line interface 26 for receiving SDH/SONET frames(HDLC-like frames), from the physical layer side device; a RX SDH/SONET de-framer 27 for de-framing the SDH/SONET frames; a SDH overhead extraction unit 34 for removing the overheads; a pointer interpretation unit 28 for locating and interpreting the pointer, extracting the SPE/VC4, and separating the LAPS frames from the SPE/VC4; a descramble unit 29 for descrambling the extracted LAPS frames; a RX LAPS processing unit 30 for deframing the LAPS frames and extracting the SAPI and the data packets encapsulated in the LAPS frames, either in the format of FIG. 4 or in the format of FIG. 12; and a RX FIFO 20 for buffering the data packets and sending the data packets, e.g. IP packets, and SAPI value to network layer side device, for example, the network processing engine 8 in FIG. 6. The IOSL framer/deframer 11 further includes a retransmission determining unit 36 for determining if retransmission is needed at the receive side.

According to the first embodiment of the invention, the SAPI identifier is placed at the address field, the SAPI value is extracted directly from the address field of the received frames, in the RX LAPS processing unit 30.

According to the second embodiment of the invention, the RX LAPS processing unit further includes a frame type recognizing means 42 for extracting the frame type indicator from the address field to recognize the frame type encapsulated in the SDH/frames. If the frame type indicator is "0x04", the received frames are determined to be LAPS frames; if the frame type indicator is "0xff", the received frames are PPP frames.

In addition, according to the second embodiment of the invention, the RX LAPS processing unit further includes a SAPI extracting means 43 for extracting the SAPI value from the SAPI field following the control field. If the frame type recognizing means 42 determines the frame type indicator in the address field is "0x04", which indicates the received frames are LAPS frames, the SAPI extracting means 43 goes to the two octets of SAPI field to extract the SAPI value, which shows the type of the data packets, i.e., "0x0021" for Ipv4 data packets, "0x0057" for Ipv6 data packets, or other IP packets. If the frame type recognizing means 42 determines the frame type indicator in the address field is "0xff", and the SAPI is "0021", then the received frames are determined to be PPP frames, and can be sent for further PPP processing.

The above frame type recognizing means 42 and SAPI extracting means 43 can be incorporated into a single unit, to perform the determining function of the first four octets of each frame: the address field(one octet), the control field(one octet), and the SAPI field(two octets), for facilitating 32-bit processing. Obviously, the first four octects "04 03 00 21" represent Ipv4 packets, "04 03 00 57" represent Ipv6 packets, and "ff 03 00 21" represent PPP packets encapsulating Ipv4 packets.

The IOSL framer/de-framer also includes POH monitor for monitoring the POH; SDH overhead monitor for monitoring the SOH; a microprocessor I/F 36 for interfacing to a control CPU; a JTAG port for test purpose; and a GPIO register for providing operating registers; which will be described in the corresponding portions below, respectively.

The receive and transmit processing in the frame/deframer for HDLC-like data, is described below in detail. In the description hereinafter, the related functions or operations and the functional blocks or units can be implemented in form of a executable program and/or hardware designs, which will be omitted for avoiding unnecessary obscuring the main aspects of the present invention.

Structure of HDLC-like Frames

Figure 8A:
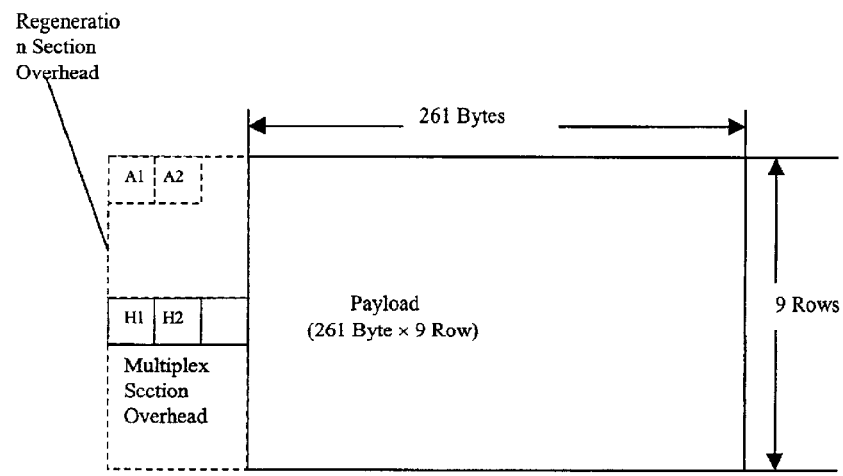
FIG. 8A shows an example of the structure of the SPE/VC of STM-N.

FIG. 8A illustrates an example of the structure in a HDLC frame. As shown in FIG. 8A, there is a payload(SPE/VC) of 261 Byte×9 Row, and Regenerator Section Overhead, AU(administration unit)pointer, and Multiplex Section Overhead, as the SDH/SONET overhead. The AU pointer portion includes H1, H2 bytes which indicate the start position of the payload. The RSOH portion includes A1, A2 bytes for locating the position of a frame.

Figure 8B:
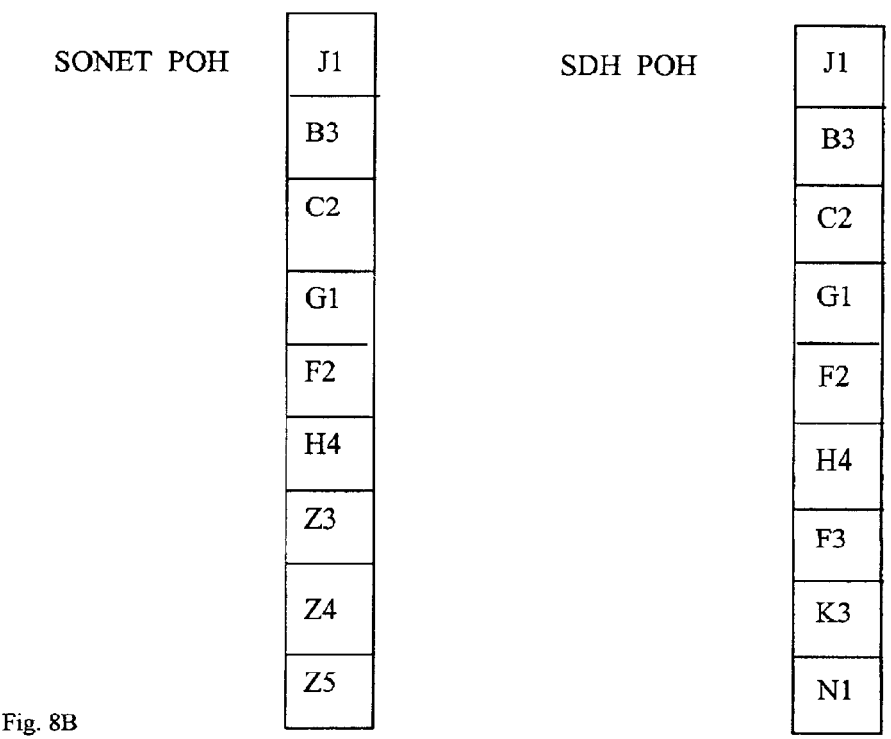
FIG. 8B illustrates the POH(path overhead) structure used in SDH and SONET.
Figure 8C:
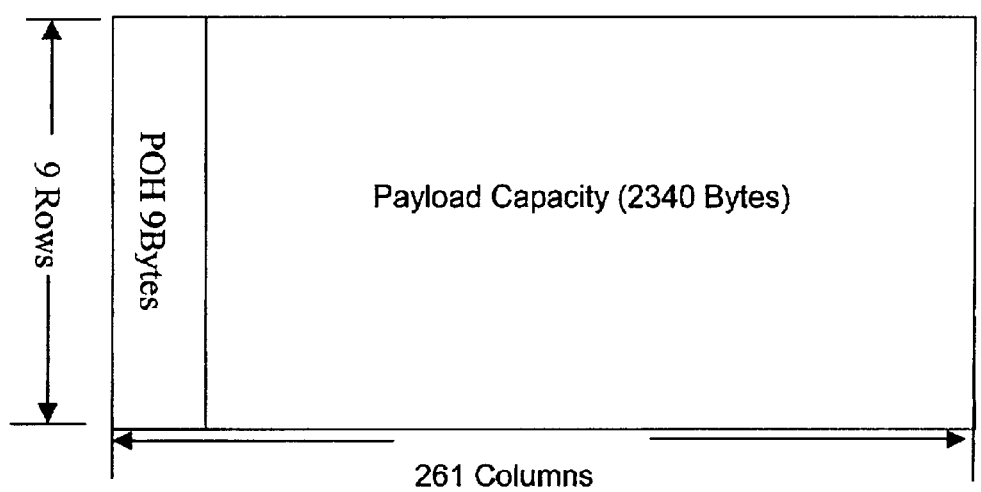

FIG. 8B shows the structure of the path overhead and FIG. 8C shows the position of the POH in the payload(SPE/VC). As shown in FIGS. 8B and 8C, the POH includes J1, B3, C2, G1, F2, H4, Z3, Z4 and Z5, and J1, B3, C2, G1, F2, H4, F3, K3 and N1 for SONET and SDH, respectively, and the 9 byte POH are located at the first column in the payload.

Receive SONET/SDH Processing

The RX de-framer 27 is implemented as a receive SONET/SDH processor. The Receive SONET/SDH Processor provides for the framing of the STS signal, descrambling, TOH/SOH monitoring including B1 and B2 monitoring, AIS detection, pointer processing, and POH monitoring. The Receive SONET/SDH Processor performs the following functions:

Identify and extract the information field of LAPS according to the SAPI.

SONET/SDH de-framing, [A1 A1 A2 A2] bytes are detected and used for framing. Provides OOF and LOF indicators (single event and second event).

Descrambling of payload using SONET/SDH frame synchronous descrambler 29, polynomial $(X^7+X^6+1)$.

Overhead monitoring performed by overhead monitor block 32;

Pointer state determination or interpretation unit 28 examines the H1–H2 bytes to establish the state of the received pointer (Normal, LOP, AIS). If the pointer state is normal, the first H1H2 bytes are read to determine the start of the SPE/VC.

The POH monitoring block 31 consists of J1, B3, C2, and G1 monitoring. These POH bytes are monitored for errors or changes in states.

For the purpose of determining whether or not the bit error rate of the received signal is above or below two different provisionable thresholds, the IOSL provides two B2 error rate threshold blocks. The Signal Fail (SF) and the Signal Degrade (SD) conditions are reported when thresholds are exceeded via interrupts.

Transmit SONET/SDH Processing

The TX framer 25 is implemented as a transmit SONET/SDH processor. Transmit SONET/SDH Processor provides for the encapsulation of the LAPS frames into the SPE/VC. It then inserts the appropriate POH and TOH/SOH and outputs the final STS signal to a parallel to serial converter followed by a Fiber Optic transceiver.

The Synchronous Payload Envelope/Virtual Container (SPE/VC) pointer adjustment block 24 adjusts the pointer and multiplexes LAPS frames from the system interface with Path Overhead (POH) bytes that it generates to create the SPE for SONET or VC for SDH;

Inserting overheads: POH bytes, by overhead insertion block 33;

Scrambling of payload using SONET/SDH frame synchronous scrambler 23, polynomial ($X^7+X^6+1$).

Below describes the LAPS processing in detail.

LAPS Processing

According to the embodiment of the present invention, the IOSL framer/deframer 11 extracts frames/packets from the SONET Payload Envelope (SPE). Frames/packets are extracted via a LAPS processor. The IOSL also supports a flow-thru mode that allows the SPE to pass directly to the System Interface. The LAPS processor performs LAPS like framing for LLC and other packet based data. The LAPS processor is a single channel engine that is used to encapsulate packets into an LAPS frame according to the present invention. The LAPS processor operates on byte aligned data only (e.g. the message is an integer number of bytes in length) for SONET/SDH. According to one embodiment of the present invention, the LAPS processor is broken up into a Receive LAPS Processor and a Transmit LAPS Processor, as shown in FIG. 7.

Encapsulation

LAPS link entity accepts frames from the network layer or other upper layer through the Reconciliation sub-layer and an equivalent "POS PHY/UTOPIA". The adaptation and primitive relationship between IP and LAPS and SDH are showed in FIGS. 3B, 3C and 5A, 5B. FIG. 4 presents the format of LAPS frame after encapsulating a type of information field. The function unit of IP over SDH forwards all incoming LAPS information field to its peer connected link except the originating link port, and is permitted to buffer one or more incoming frames before forwarding them.

Receive LAPS Processor

LAPS Receive (Rx) Processing in the RX LAPS processor 27 mainly includes the following functions.

The received SPE (Synchronous Payload Envelop) octet stream is assumed to contain one or more continuous LAPS frames streams.

According to the LAPS frame format in FIG. 4 of one embodiment of the present invention, the LAPS encapsulation consists of the start Flag Sequence, address field (SAPI, Service Access Point Identifier), control field (0x03), Information field (Ipv4, Ipv6, or PPP protocol data unit), FCS (Frame check sequence) and the ending Flag Sequence; while according to the LAPS frame format in FIG. 12 of another embodiment of the present invention, the LAPS encapsulation consists of the start Flag Sequence, address field, control field, SAPI (Service Access Point Identifier), Information field (Ipv4, Ipv6, or PPP protocol data unit), FCS (Frame check sequence) and the ending Flag Sequence., The Ipv4, Ipv6, IS-IS or PPP protocol data units are extracted and stored in the Rx FIFO (First-In-First-Out) 20.

The Receive LAPS Processor 27 provides for the extraction of LAPS frames, transparency removal, FCS error checking, de-scrambling of the SPC/VC payload, optional deletion of the SAPI field, the control and address fields, and performance monitoring.

After the start/end of field flags and byte stuffing are removed the remaining payload includes the data and the FCS field. See figure below for details. Note, only one flag byte is actually required between two packets. All flags between packets are discarded.

Specifically, the Receive LAPS Processor performs the following functions:

Optionally self synchronous de-scrambles ($X^{43}+1$ polynomial) received payload.

Detects and terminates the LAPS frame, e.g. frame delimiting flag detection.

Removes Control Escape stuffing

Calculates optional FCS code (32 bit) and compares it against the received FCS value. Errors are accumulated in Performance Monitor Registers. Outgoing data is marked as errored if FCS error is detected.

Detects abort sequence in (0x7D, 0x7E) in byte stream.

Optionally deletes Address and Control fields.

Provides optional minimum and maximum packet length detection (SW configurable) and asserts RX_ERR signal with data to mark errored condition.

Generates Performance Monitoring for octets: FCS Errors, Aborted packets, Short Packets, Long Packets, Packets discarded due to RXFIFO error.

Optionally deletes packet stuffing used to handle far end FIFO underflow conditions.

Generates interrupt on error conditions.

Automatically deletes inter-packet gap of flags.

Below describes the detail implementation of the functions of the RX LAPS processor 27.

LAPS Frame Synchronization

The Flag Sequence (0x7E) identifies the beginning/end of a LAPS frame. The received SPE payload data is searched octet-by-octet for the Flag Sequence in order to locate the LAPS frame boundaries. The octet value used to identify the Flag Sequence shall be programmable and defaults to 0x7E.

Two consecutive Flag Sequences constitutes an empty frame that is simply ignored. N consecutive Flag Sequences is therefore counted as N–1 empty frames. Frames which are too short, Invalid Frames, are silently discarded. Frames are considered invalid if a LAPS frame a) is not properly bounded by two flags; or b) has fewer than six octets between flags of frames; or c) contains a frame check sequence error; or d) contains a service access point identifier which is mismatched with "4" (Ipv4-based service), "6" (Ipv6-based service), "255" (PPP-based service) in case of the first embodiment of the present invention; or contains a service access point identifier which is mismatched with "0021" (Ipv4-based service), "0057" (Ipv6-based service) when the said frame indicator is "4", "0021" (PPP-based packets) when said frame indicator is "255"; or not supported by the receiver; or e) contains an unrecognized Control field value; or f) ends with a sequence of more than six "1" bits.

LAPS Octet De-stuffing Processing(transparency processing)

The LAPS octet de-stuffing procedure (also sometimes referred to as escaping transform), is applied on the received LAPS frames before FCS calculation and after LAPS frame synchronization. Octet de-stuffing is done by the examination of the entire LAPS frame between the start and ending Flag Sequences for the control escape octet. When found, the control escape octet is removed from the octet stream, and the following octet is applied to exclusive-or' d operation with an octet de-stuffing masking octet. The abort sequence shall not be considered an escape sequence.

The control escape octet value shall be programmable and defaults to 0x7D. The octet de-stuffing masking octet shall be programmable and defaults to 0x20. As an example, 0x7E is encoded as 0x7D, 0x5E. 0x7D is encoded as 0x7D, 0x5D.

The SAPI Protocol Encapsulation Field (Address Field) Stripping.

According to the first embodiment of the present invention, the SAPI field is specified to be located in the octet position following the LAPS Flag. The SAPI Field is single octet long. "0x04", "0x06", "0x08", "0x0c" and "0xff" of the hex value shall stand for Ipv4-based packet, Ipv6-based packet, IS-IS-based packet, Ethernet-based packet and PPP based packet respectively. The SAPI field shall be stripped off before the frame is stored in the Rx FIFO 20.

According to the second embodiment of the present invention, the SAPI field is specified to be located in the octet position following the control field. The SAPI Field is two octets long. "0x0021", "0x0057", or other predetermined values of the hex value shall stand for Ipv4-based packet, Ipv6-based packet, and any other types of data packets, respectively. The SAPI field shall be stripped off before the frame is stored in the Rx FIFO 20.

LAPS Abort Sequence.

The Abort Sequence (Control Escape followed by Flag Sequence) may be optionally detected in the incoming LAPS frames. An Abort Sequence marks the end of an aborted LAPS frame.

FCS Computation.

The received FCS Field shall be verified. The FCS checksum is calculated over all octets between the LAPS start/end delimiting Flag Sequences (incl. the FCS field) after the octet de-stuffing procedure has been performed. The verification can be implemented for two different FCS types.

The first is a 16-bit CRC-CCITT with the generating polynomial $1+x^5+x^{12}+x^{16}$. The "Good Final FCS" value for the 16 bit FCS is 0xF0B8 (Note: In the case of the first embodiment of the invention, the 16-bit FCS is referred to RFC 2615 when the SAPI of LAPS is set to "11111111" for compatibility with RFC 2615; in the case of the second embodiment of the invention, the 16-bit FCS is referred to RFC 2615 when the address field of LAPS is set to "11111111", SAPI=" 0021" and the value of the SDH/SONET path signal label C2 is required to change from 24 (18 hex) to 22 (16 hex) for compatibility with RFC 2615, in the case of the second embodiment of the invention. In this case, the length of FCS is changed to the two octets.

Additionally, the LAPS does also provide the signal label value 207(CF hex) to indicate PPP without scrambling). The second is a 32-bit CRC-32 function with the generating polynomial $1+x+x^2+x^4+x^5+x^7+x^8+x^{10}+x^{11}+x^{12}+x^{16}+x^{22}+x^{23}+x^{26}+x^{32}$. The "Good Final FCS" value for the 32-bit FCS is 0xDEBB20E3.

The least significant FCS octet is the first arriving FCS Field octet located just after the last LAPS Information field octet. The least significant FCS byte (the coefficient of the highest term) is the first inserted/transmitted FCS byte located just after the Last Information field byte. The CRC calculator is fed with the least significant (last transmitted) bit order per byte. The transmitted bits are scrambled in the order they are transmitted. If the calculated FCS checksum does not match the "Good Final FCS value", the FCS of LAPS frame is considered to be errored. In default case, the FCS verification is performed for the 32-bit CRC.

De-scrambling with Self-Synchronizing Scrambler (SSS) $1+x^{43}$

Figure 9A:
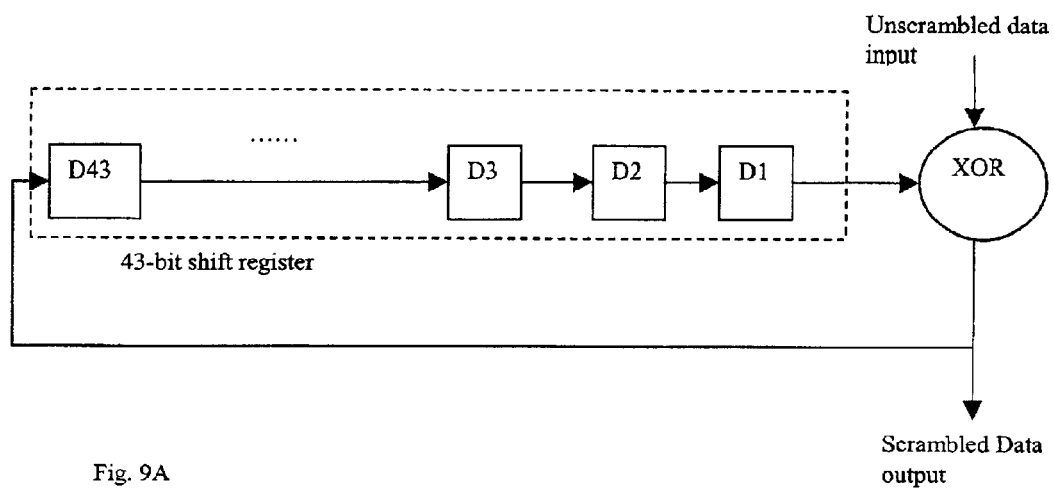
FIG. 9C illustrates the position of the POH in the SPE/VC.
FIG. 9 illustrates the structure of the scrambler and descrambler used in the IOSL framer/deframer according to the present invention.
Figure 9B:
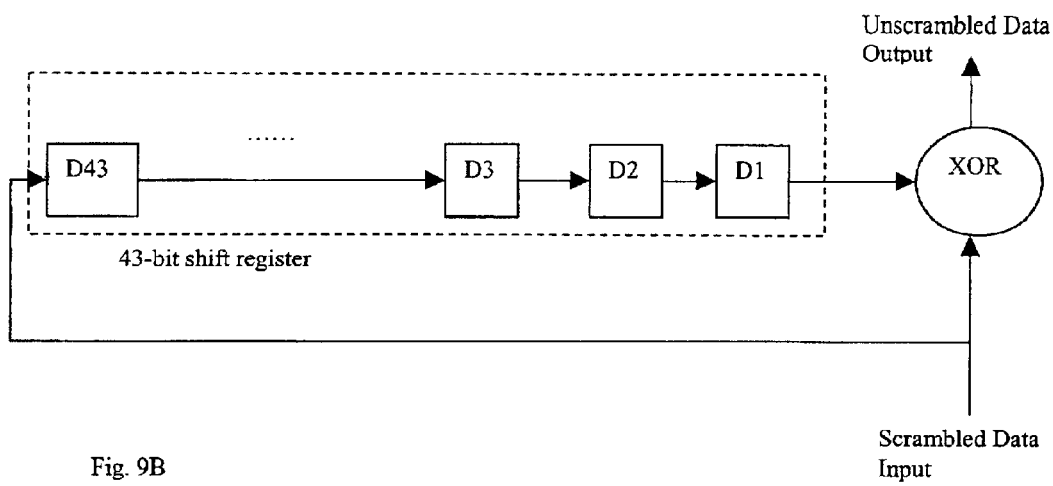

FIG. 9B illustrates the structure of the de-scrambler 29 in FIG. 7 according to one embodiment of the present invention. As shown in FIG. 9B, the de-scrambler includes a XOR gate and a 43-bit shift register, and the output bits is exclusive-ored with the input scrambled data bits to produce the unscrambled bits.

The received data shall be de-scrambled with the self-synchronizing descrambler $X^{43}+1$. The arriving bits are de-scrambled in the incoming order. The de-scrambler can be operated in three alternative ways—full de-scrambling, partial de-scrambling and non-de-scrambling. The selection of three alternative ways is made by the initial configuration. For full de-scrambling, the SSS is applied before any of the LAPS framing functions are performed, that is, the entire (full) content of the SPE payload is de-scrambled. For partial de-scrambling, the SSS is applied on all LAPS octets except for the Flag Sequence and the Abort Escape octet. The partial scrambler is applied after octet de-stuffing and before LAPS protocol fields processing. Both de-scrambling procedures may be independently on/off. For non-de-scrambling, That is to disable any scrambling function. It is important for interoperability with older equipment, that may not have been added with scrambler functionality. In default case, the full de-scrambling procedure is set to on (enabled) only.

Too-long Packet Processing.

If the octet number of the entire packet written to the Rx FIFO is greater than a programmable value of Maximum Packet Size (MPS), the packet is considered to be "too-long".

For too-long packets, writing more than MPS of the packet to the Rx FIFO may be disabled. The last word (For SDH/SONET serious rates STM-1/4/16/64 or OC-3/12/48/192, the possible interface configurations/width of input to Network processor are the 8 bit×25 Mhz, 16 bit×50 Mhz, 32 bit×100 Mhz, 64 bit×50 Mhz, 64 bit×200 Mhz, 128 bit×100 Mhz,) of the long packet written to the Rx FIFO is always EOP marked, regardless of whether this function is enable or disable. Also, the operation of the Rx FIFO error marking and discard function are independent of this function. Note that this option should only be used only if both the Rx FIFO error marking and the Rx FIFO discard function are enabled. The MPS of Ipv4 defaults to 1600 octets, and can be changed and programmed to the MPS of Ipv6. In default case, only MPS of the long packets are written into the Rx FIFO.

Too-short Packet Processing.

If the octet number of the entire packet written to the Rx FIFO is less than a programmable value of Minimum Packet Size (mPS), the packet is considered "too-short".

The mPS defaults to 64 octets, and can be programmed in the range 8 to 65535.

The SAPI and Information Field Storage in Rx FIFO

The SAPI and Information Fields are extracted and stored in the Rx FIFO aligned to the 128-bit or 64-bit boundary for STM-64c/OC-192c, the 64-bit or 32-bit boundary for STM-16c/OC-48c, the 16-bit boundary for STM-4c/OC-12c, the 8-bit boundary for STM-1/OC-3c, on a per LAPS frame basis. The storage of the SAPI Field in the Rx FIFO can be enabled/disabled. By default, the SAPI field is stored in the Rx FIFO.

For example, the size of the Rx FIFO size is 512 words (32×100 Mhz) in OC-48c/STM-16c, which may accommodate storage for a total of 2048 information field octets. Assuming a MPS of 1600 octets, this accommodates buffer pool for one packet plus some extra overhead (about 448 octets). One word may be written to the Rx FIFO every 77.8 MHz core clock cycle. The received Information Fields will be spaced with minimum five octets between them (four FCS octets+1 Flag Sequence octet). Four SPE payload octets arrive every 77.8 MHz core clock cycle, and one word can be written to the Rx FIFO every 77.8 MHz core clock cycle. Therefore, for any SAPI/Information Field size, there will be enough bandwidth on the Rx FIFO write interface to store the SAPI/Information Fields. Thus, there is enough bandwidth on the Rx FIFO write interface to handle the reception of any LAPS payload stream.

Rx FIFO Overflow Event Processing

IP over SDH/SONET Framer writes packets into the Rx FIFO in the receive direction. If the Rx FIFO becomes full (the last available word of Rx FIFO slot is filled up), an alarm shall be generated to report overflow event to the management interface. The occurrence of FIFO overflow also causes the performance counter to be incremented. In this case, the EOP field of the last word stored in the Rx FIFO will automatically be set to a logical one.

For packets experiencing an Rx FIFO full event, the remaining packet octets (if any) shall not be stored in the Rx FIFO. Furthermore, no words shall be written into the Rx FIFO until a programmable initialization level of free storage area is reached. The first word written into the Rx FIFO following the full event shall be a SOP marked word.

Error Processing:

A number of events define the received LAPS frames as being "errored". For these errored LAPS frames two different procedures may be applied:

(1) Error Marking. IP over SDH/SONET Framer will mask the errored packet that has been corrupted by Rx FIFO overflow. The RX_ERR flag is set for the last SAPI/Information Field word written into the Rx FIFO for that corresponding LAPS errored frame.

(2) Packet Discartion. All of the SAPI/Information Field words (the packet) written into the Rx FIFO for that corresponding LAPS errored frame are discarded.

Connection Management Function

As shown in FIG. 7, the IOSL framer/deframer includes a connection management unit 36 for determining the error or disconnection during the data transmission. The connection management entity 36 is used optionally to monitor the link status of receiving the peer link frame. It is local matter only and has not any associated frame to be used between the two sides of RX and TX.

Specifically, the connection management unit 36 includes a timer T200 and a counter N200.

After initialization (the defaults of T200 and N200 are set to 1 seconds and 3 respectively), the link entity enters the normal way of transmitter and receiver.

If the timer T200 expires before any frame (including information frame and inter-frame time fill) is received, the link entity shall restart timer T200 and decrement the retransmission counter N200.

If the timer T200 expires and retransmission counter N200 has been decremented to zero before any frame is received, the link entity shall indicate this to the local connection management entity by means of the MDL-ERROR indication primitive, and restart timer T200 and recover the value of N200.

The value of T200 and N200 shall be configurable. The minimum unit configured of T200 and N200 is 100 milliseconds and 1 respectively.

The following statistics shall be made available in performance monitoring counters. All performance monitor counters shall be 32-bit length.

Received Empty LAPS frames.
Received Too-Long packets
Received Invalid Frames.

Below describe the processing of the TX LAPS processor in detail.

Transmit LAPS Processor

LAPS Transmit (Tx) Processing in the TX LAPS processor 22 mainly includes the following functions:

The Ipv4, Ipv6, or PPP protocol data units read out from the TX FIFO 18 and encapsulated into LAPS frame that is satisfied to the requirement of mapping into the SPE payload.

According to the first embodiment of the invention, the LAPS encapsulation consists of the start Flag Sequence, address field (SAPI, Service Access Point Identifier), control field (0x03), Information field (Ipv4, Ipv6, or PPP protocol data unit), FCS (Frame check sequence) field and the ending Flag Sequence; according to the second embodiment of the invention, the LAPS encapsulation consists of the start Flag Sequence, address field, control field, SAPI (Service Access Point Identifier), Information field (Ipv4, Ipv6, or PPP protocol data unit), FCS (Frame check sequence) field and the ending Flag Sequence.

The transmitted SPE (Synchronous Payload Envelop) octet stream is assumed to contain one or more continuous LAPS frames streams.

Specifically, the Transmit LAPS Processor 22 provides the insertion of packet-based information into the STS SPE. It provides packet encapsulation, FCS field generation, inter-packet fill, TX FIFO error recovery and scrambling. The Transmit LAPS Processor performs the following functions:

Encapsulates packets within an LAPS frame. According to the first embodiment of the invention, each packet is encapsulated with a start flag (0x7E), an optional FCS field, optional Address and Control fields, and an optional end of field flag (0x7E); or according to the second embodiment of the invention, each packet is encapsulated with a start flag (0x7E), an optional FCS field, optional SAPI field, Address and Control fields, and an optional end of field flag (0x7E).

Optional self synchronous transmit payload scrambler ($X^{43}$+1 polynomial).

Transparency processing as required by ITU-T X.85 (octet stuffing for Flags & Control Escape). Byte stuffing occurs between start and end of field flags. Stuffing replaces any byte that matches the flag or the control escape bytes with a two byte sequence consisting of the Control Escape followed by the original byte exclusive-ored with (0x20) HEX.

Generates start and end of field flags (0x7E). Note a single flag can be shared between two packets.

Optionally generates 32-bit CRC for Frame Check Sequence (FCS) field.

Provides the ability to insert FCS errors for testing under SW control.

TX_PRTY errors generate an interrupt.

Provides for a selectable treatment of FIFO underflow. A FIFO underflow condition occurs when a TX FIFO empty occurs prior to the end of a packet. When this occurs an interrupt is generated. The packet can either be ended via generation of a FCS error, or an abort sequence, or "fill" bytes can be inserted during the gap via a SW configurable escape code.

Generates Performance Monitor counts that include: Number of FIFO error events, aborted packets, and number of packets that violate minimum and maximum packet length parameters (SW configurable).

The LAPS Frame Encapsulation

Each frame at the data link layer is delineated by using the Flag Sequence according to the present invention. The Flag is used to indicate both the beginning and end of a LAPS frame. The LAPS frame octet stream is also adapted to the SPE payload bandwidth by inserting the Flag Sequence between LAPS Frames as needed for rate adaptation. The transmitted LAPS frames will be separated by at least one Flag Sequence. The inserted Flag Sequence octet value shall be programmable and defaults to 0x7E. The end flag of a previous frame can be the star flag of the next frame. The Address Field is inserted after the beginning Flag Sequence. According to the first embodiment of the invention, the inserted address Field(which is also the SAPI field) value shall be programmable and dependent on encapsulated packet types. SAPI is determined by the determining unit based on the type of the incoming data packets. For Ipv4 based packet, Ipv6 based packet, IS-IS based packet, Ethernet-based packet and PPP based packet, a corresponding values are "0x04", "0x06", "0x08", "0x0C" and "0xFF" respectively. Or alternatively, according to the second embodiment of the invention, the SAPI field is between the control field and the information field, the value thereof can be "0x0021", "0x0057" or other predetermined values, for Ipv4 based packet, Ipv6 based packet, or other types of data packets, respectively.

LAPS Control Field. The Control Field follows the Address Field. The inserted Control Field value shall be set and defaults to 0x03.

LAPS Frame Check Sequence (FCS). For the first embodiment, the FCS is calculated over the Address, Control, Protocol and Information Field; and for the second embodiment of the invention, the FCS is calculated over the Address, Control, SAPI, and Information Field. It does not include the Flag Sequence, nor the FCS field itself. The calculation is performed before Octet Stuffing is applied. Two FCS types can be generated. The first is a 16-bit CRC function generated with the generating polynomial $1+x^5+x^{12}+x^{16}$. (Note: In the case of the first embodiment of the invention, the 16-bit FCS is referred to RFC 2615 when the SAPI of LAPS is set to "11111111" for compatibility with RFC 2615; in the case of the second embodiment of the invention, the 16-bit FCS is referred to RFC 2615 when the address field of LAPS is set to "11111111", SAPI=" 0021" and the value of the SDH/SONET path signal label C2 is required to change from 24 (18 hex) to 22 (16 hex) for compatibility with RFC 2615, in the case of the second embodiment of the invention. In this case, the length of FCS is changed to the two octets).

The second is a 32 bit CRC-32 function generated with the generating polynomial $1+x+x^2+x^4+x^5+x^7+x^8+x^{10}+x^{11}+x^{12}+x^{16}+x^{22}+x^{23}+x^{26}+x^{32}$.

The IOSL framer/deframer 11 supports CRC-32 Frame Check Sequence (FCS) generation and checking. The FCS is transmitted least significant octet first, which contains the coefficient of the highest term. The IOSL device can be provisioned to calculate the FCS either using little endian bit order as per LAPS or big endian bit order.

For the first embodiment, the FCS field is calculated over all bits of the Address(SAPI value), Control, Information fields, and for the second embodiment of the invention, the FCS is calculated over all bits of the Address, Control, SAPI, and Information Field, and in both cases, not including any octets inserted for transparency. This does not include the Flag Sequences nor the FCS field itself. With both FCS methods, the CRC generators and checkers are initialized to all Logic "ones". Upon completion of the FCS calculation the FCS value is ones-complemented. It is this new value that is inserted in the FCS field.

The calculated FCS is complemented before being inserted into the LAPS frame, by xor' ing the calculated FCS value with 0xFFFF or 0xFFFFFFFF for the 16-bit and 32-bit FCS respectively. The least significant FCS octet (the coefficient of the highest term) is the first inserted/transmitted FCS octet located just after the Last Information Field octet. The CRC calculator is fed with the least significant (last transmitted) bit first per octet. In default case, the 32-bit FCS value is inserted.

Octet Stuffing

The LAPS octet stuffing procedure (also sometimes referred to as escaping transform), is applied on the transmitted LAPS frames after FCS calculation and partial scrambling. Octet stuffing is done by the examination of the entire LAPS frame between the beginning and end Flag Sequences for the control escape octet. When found, 0x7E is encoded as 0x7D, 0x5E. 0x7D is encoded as 0x7D, 0x5D. The abort sequence shall not be considered an escape sequence.

The control escape octet value shall be programmable and defaults to 0x7D. The octet stuffing masking octet shall be programmable and defaults to 0x20.

Scrambling with Self-Synchronizing Scrambler (SSS) $x^{43}+1$

FIG. 9A illustrates the structure of the scrambler 23 in FIG. 7 according to one embodiment of the present invention. As shown in FIG. 9A, the scrambler 23 includes a XOR gate and a 43-bit shift register, and the output bits is exclusive-ored with the raw input data bits to produce the scrambled bits.

The transmitted data shall be scrambled with the self-synchronizing scrambler $x^{43}+1$. The transmitted bits are scrambled in the order they are transmitted. The scrambler can be operated in three alternative ways—full scrambling, partial scrambling and non-scrambling. The selection of three alternative ways is made by the initial configuration. For full scrambling, the SSS is applied before they are mapped into the SPE, that is, the entire (full) content of the SPE payload is scrambled. For partial de-scrambling, the SSS is applied on all LAPS octets except for the Flag Sequence and the Abort Escape octet. The partial scrambler is applied after PPP/LAPS field generation but before the stuffing procedure. Both scrambling procedures may be independently on/off. For non-de-scrambling, That is to disable any scrambling function. It is important for interoperability with older equipment, that may not have been added with scrambler functionality. In default case, the full scrambling procedure is set to on (enabled) only.

SAPI and Information Field

The SAPI and Information Fields shall be generated internally or get from Tx FIFO aligned to the 64-bit or 32-bit boundary for STM-16c/OC-48c, the 16-bit boundary for STM-4c/OC-12c, the 8-bit boundary for STM-1/OC-3c, on a per LAPS frame basis. When generated internally, the size (one or two octets) and value of the inserted SAPI Field shall be programmable, and defaults to the single octet value 0x04 (stand for Ipv4 based service) according to the format in FIG. 4 of the first embodiment, and defaults to the two octet value 0x0021 (stand for Ipv4 based service) according to the format in FIG. 12 of the second embodiment,. When got from the Tx FIFO, the packet stored in the Tx FIFO is inserted as the SAPI/Information Fields in the generated LAPS frames. In default case, the SAPI Field source is the Tx FIFO.

The packets are aligned to the 128-bit or 64-bit boundary for STM-64c/OC-192c, the 64-bit or 32-bit boundary for STM-16c/OC-48c, the 16-bit boundary for STM-4c/OC-12c, the 8-bit boundary for STM-1/OC-3c, on a per LAPS frame basis. The size of the Tx FIFO shall be programmable in the range from 1 to 4096 words, where a word is equivalent to 32 bits. In default case, the size is 4096 words, equivalent to 16384 octets of Package data storage.

All valid packet octets stored in the Tx FIFO are read out and mapped into the SAPI/Information Fields of generated LAPS frames. Data shall be read out from the Tx FIFO in the way of back-to-back mapping of the LAPS frames into the SPE. In the mode of packet transfer, a readout of a packet will not begin until there is at least one EOP (End of packet) marked word in the Tx FIFO. In word transfer mode, a readout of a packet from the Tx FIFO can be started when the entire packet is not yet stored in the Tx FIFO. In default mode, word transfer mode is enabled.

Tx FIFO Underflow Processing

During readout of a packet from the Tx FIFO, if the Tx FIFO runs in an unexpectedly empty way before the EOP packet marked word is read, the LAPS frame where this packet is being mapped into may optionally be aborted with the LAPS Abort Sequence. An LAPS Abort request made via the CPU interface shall still be active, if the following frame is discarded because of a Tx FIFO underflow.

If the optional abort option is set to off, the transmitted LAPS frame will end with the calculated FCS Field. The rest of the packet, which read from the Tx FIFO when the underflow occurred, will be flushed. This is done by reading from the Tx FIFO, until a SOP marked word is found. Meanwhile, empty frames will be transmitted.

Aborted Frame

A special byte code (0x7D 0x7E) is used to indicate that a frame has been aborted. If these bytes are received, the associated frame will be discarded. If the packet is transmitted to the peer link device, then is marked as errored.

Below decribes in detail the Processing of Data in the Transmit Direction in the Framer/De-framer according to one embodiment of the present invention.

In the Transmit Direction, the IOSL device provides for the insertion of packet based data into the STS/STM SPE. The operating mode of the device is provisionable through the management control interface.

Transmit FIFO Interface

In IOSL device, the Transmit System Interface operates as a "POS PHY/UTOPIA" compliant interface.

Transmit FIFO

The Transmit System Interface is controlled by the Link Layer device that precedes the IOSL device in the transmit direction of the transmission path. The Link Layer device provides an interface clock to the IOSL device for synchronizing all interface transfers. This convention requires the IOSL device to incorporate a rate-matching buffer (i.e. a FIFO). The size of the FIFO is 256 octets.

The IOSL device also transfers the packet status (start/end of packet/cell, whether the last word in the packet consists of one or two octets, packet error) through the FIFO.

Transmit FIFO Error

In IOSL device, the state of the FIFO is monitored by the IOSL device. A FIFO error condition is declared whenever 1) a IOS_TX_SOP is received prior to the end of a packet (TX_EOP indication) or 2) the IOS_TX_ENB is active beyond the "transmit window" following the deassertion of the TX_CLAV signal. FIFO error events are reported to the management interface by setting IOS_TX_FIFOERR_E= 1.

The IOSL device contains an 8-bit FIFO error counter that counts every packet affected by a FIFO error event.

When the performance monitoring counters are latched, the value of this counter is latched to the IOS_TX_FIFOERR_CNT[7:0] register, and the FIFO error counter is cleared. If there has been at least one FIFO error event since the last rising edge of LATCH_EVENT, then the FIFO error event bit, IOS_TX_FIFOERR_SECE, is set. In IOS mode (IOS_TX_IOS=1), the IOSL device aborts the errored packets.

IOS Errored Packet Handling

In IOS mode of operation, (IOS_TX_IOS=1), the following errored packet handling procedures are provided:

TX_ERR Link Layer Indication

The Transmit System Interface provides a method by which the Link Layer device can indicate to the IOSL device when a particular packet contains errors and should be aborted or discarded (see definition of IOS_TX_ERR.

The IOSL device contains an 8-bit link layer error counter that counts every packet received from the Link Layer that is marked as errored. When the performance monitoring counters are latched (LATCH_EVENT transitions high), the value of this counter is latched to the IOS_TX_IOS_LLPKT_ERRCNT[7:0] register, and the link layer packet error counter is cleared.

If there has been at least one link layer packet error since the last rising edge of LATCH_EVENT, then the link layer packet error event bit, IOS_TX_IOS_LLPKT_ERR_SECE, is set.

Minimum/Maximum Packet Sizes

The IOSL device also, as an option, views a packet as being errored and does not transmit it or aborts if it violates minimum or maximum packet sizes. The packet sizes refer to the size of the LAPS packet only, and do not include the bytes inserted by the IOSL device (flag sequence, address, control, SAPI(if any), FIFO underflow, transparency or the FCS bytes).

These minimum and maximum sizes are programmable via the management control interface. In the IOS device there are a plurality of Registers to store various values, such as the above mPS, MPS.

Line Side Packet Loopback

For testing purposes, the IOSL device also provides the capability for the user to loopback the packets it extracts from the SONET/SDH signal into the transmit direction FIFO, where it replaces the data received from the System Interface. This data will then undergo the transmit side LAPS processing, and be sent back out the SONET/SDH line. When IOS_R_TO_T_LOOP is set to 1, the loopback is activated. When IOS_R_TO_T_LOOP is 0, the loopback is inhibited and normal processing proceeds.

This loopback is provided primarily for device testing purposes. In actual operation, if the receive clock is faster than the transmit clock and the SONET/SDH payload is filled with packets, there could be periodic errors due to the inability of the transmit side to accommodate the full data rate of the receive side.

As an option, the IOSL device may insert a single flag to indicate both the end of one frame and the start of the following frame. This is controlled via the management interface; if IOS_TX_IOS_EOP_FLAG=1, the IOSL device inserts separate flags to indicate the start and end of frame. If IOS_TX_IOS_EOP_FLAG=0 (the default), only a single Flag Sequence may be inserted.

In the special case when generation of the FCS field is inhibited, IOS_TX_IOS_EOP_FLAG is ignored by the IOSL device, and start and end of frame Flag Sequences are always inserted. This is non-standard operation, as the FCS field is mandatory according to ITU-T X.85. This feature is required to insure proper operation at the receive side during testing periods in which the FCS is inhibited and single byte packets are possible.

Address and Control Fields

There are two fields immediately following the start of frame Flag Sequence: an Address byte, set to "0x0c", according to the first embodiment of the invention, or set to "0x04" or "0xff" or programmable other value, according to the second embodiment of the invention; and a Control byte, which is defined to be 00000011. In IOS mode (IOS_TX_IOS=1), the IOSL device will optionally insert these fields, if IOS_TX_IOS_ADRCTL_INS=1. It will not insert these fields if IOS_TX_IOS_ADRCTL_INS=0 (the default).

Transparency

An octet stuffing procedure is performed at this point, which is referred to as Transparency Processing. A specific octet, Control Escape (01111101 or hexadecimal 0x7d) is used as a marker to indicate bytes that will require specific processing at the receive side. Control Escape is used to mark any occurrence of specific codes in the frame data.

After FCS computation, the IOSL device examines the entire frame between any two Flag Sequences. Each occurrence of any code identified by 0x7e or 0x7d is replaced by a two octet sequence consisting of the Control Escape octet followed by the original octet exclusive-or' d with hexadecimal 0x20. The IOSL device performs transparency processing on the following byte sequences, with the single exception of the Flag Sequences that are inserted by the IOSL device to delineate the frames. Occurrences of 0x7e in the payload (between Flag Sequences) are processed as described 0x7e is encoded as 0x7d, 0x5e
0x7d is encoded as 0x7d, 0x5d SPE Creation The IOS stream is then mapped into the payload of the SONET/SDH Synchronous Payload Envelope (SPE). The IOS octet boundaries are aligned with the SPE octet boundaries. As IOS frames are variable in length, they are allowed to cross SPE boundaries. When, during operation, there are no LAPS frames available for immediate insertion into the SPE, the Flag Sequence is transmitted to fill the time between LAPS frames. This is only done between complete frames.

SPE/VC Generation

SPE/VC Structure

The first column of the SPE/VC is the POH. The ordering of these 9 bytes is shown below for SONET and SDH, as shown in FIG. 8A–8C.

For reference, the bandwidth of SDH Virtual Containers and STM interface rates are showed in Table 2 and Table 3 respectively.

TABLE 2

The bandwidth of the SDH Virtual Containers

| VC type | VC bandwidth (kbits/s) | VC payload (kbit/s) |
| --- | --- | --- |
| VC-11 | 1 664 | 1 600 |
| VC-12 | 2 240 | 2 176 |
| VC-2 | 6 848 | 6 784 |
| VC-3 | 48 960 | 48 384 |
| VC-4 | 150 336 | 149 760 |
| VC-4-4c | 601 304 | 599 040 |
| VC-4-16c | 2 405 376 | 2 396 160 |
| VC-4-64c* | 9 621 504 | 9 584 640 |

TABLE 3

STM interface rates

| STM type | STM bit rate (kbit/s) |
| --- | --- |
| sSTM-11 | 2 880 |
| sSTM-12 | 5 184 |
| sSTM-14 | 9 792 |
| sSTM-18 | 19 792 |
| sSTM-116 | 37 444 |
| sSTM-21 | 7 488 |
| sSTM-22 | 14 400 |
| sSTM-24 | 28 224 |
| STM-0 | 51 840 |
| STM-1 | 155 052 |
| STM-4 | 622 080 |
| STM-16 | 2 488 320 |
| STM-64 | 9 953 280 |

The SONET transmission rates are integral multiples of STS-1(51.840 Mbps), The allowed multiples are currently as follows:

STS-1: 51.840 Mbps
STS-3: 155.520 Mbps
STS-9: 466.560 Mbps
STS-12: 622.080 Mbps
STS-18: 933.120 Mbps
STS-24: 1244.160 Mbps
STS-36: 1866.240 Mbps
STS-48: 2488.320 Mbps
STS-192: 9 953 280 Mbps

POH

There are 9 bytes of path overhead. The first byte of the path overhead is the path trace byte, J1. Its location with respect to the SONET/SDH TOH/SOH is indicated by the associated STS/AU pointer. The following sections define the transmitted values of the POH bytes. Where the byte names differ between SONET and SDH, the SONET name will be listed first.

Path Trace (J1)

The IOSL device can be provisioned to transmit either a 16-byte or a 64-byte path trace message in the J1 byte. The messages are stored in IOS_TX_J1_[63:0]_[7:0]. If IOS_TX_J1SEL=0, the J1 byte is transmitted repetitively as the 16-byte sequence in IOS_TX_J1_[15]_[7:0] down to IOS_TX_J1_[0]_[7:0]. Otherwise, the 64-byte sequence in IOS_TX_J1_[63]_[7:01 down to IOS_TX_J1_[0]_[7:0]is transmitted. (The 16-byte sequence is normally used in the SDH mode, and the 64-byte sequence in the SONET mode.)

Path BIP-8 (B3)

The Bit Interleaved Parity 8 (BIP-8) is transmitted as even parity (normal) if B3_INV=0. Otherwise, odd parity (incorrect) is generated. The BIP-8 is calculated over all bits of the previous SPE/VC (including the POH) and placed into the B3 byte of the current SPE/VC.

By definition of BIP-8, the first bit of B3 provides parity over the first bit of all bytes of the previous SPE/VC, the second bit of B3 provides parity over the second bit of all bytes of the previous SPE/VC, etc.

Signal Label (C2)

The signal label byte indicates the composition of the SPE/VC. The provisioned value, TX_C2_[7:0], is inserted into the generated C2 bytes.

Path Status (G1)

Path REI. The Receive Side monitors B3 bit errors in the received SPE/VC. The number of B3 errors detected each frame (0 to 8) is transferred from the Receive Side to the Transmit Side for insertion into the transmit path status byte, G1, as a Remote Error Indication.

If FORCE_G1ERR=1, the 4 MSBs of G1 will continuously be transmitted as 1000 (for testing purposes). Else if PREI_INH=0, they are set to the binary value (0000 through 1000, indicating between 0 and 8) equal to the number of B3 errors most recently detected by the Receive Side POH monitoring block. Otherwise, they are set to all zeros.

Path RDI. Bit 5 of G1 can be used as a Path/AU Remote Defect Indication, RDI-P, or bits 5, 6, and 7 of G1 can be used as an enhanced RDI-P indicator. The values transmitted in bits 5, 6, and 7 of G1 are taken either from the TX_G1_[2:0] registers (if PRDI_AUTO=0), or the IOSL device automatically generates an enhanced RDI signal (if PRDI_AUTO=1 and PRDI_ENH=1), or a one bit RDI signal (if PRDI_AUTO=1 and PRDI_ENH=0). The values transmitted in bits 5, 6, and 7 of G1 are shown in Table 4.

Frame Alignment

The position of the generated frame is fixed with respect to the input, TX_FRAME_IN. A start-of-frame indication output, TX_FRAME_OUT, has a fixed but unspecified relationship to the TX_FRAME_IN input. The relationship of the 1 clock cycle wide pulses on TX_FRAME_OUT to the data bytes on the Transmit Line output TX_DATA[7:0] is controlled by the IOS_TX_FOUT_BYTE_TYPE[1:0] and TX_FOUT_BYTE_NUMBER[3:0] registers.

Payload Generation

The SONET or SDH payload is normally filled with bytes from the SPE/VC. The J1 byte of the SPE/VC is placed into column 10 of row 1 in STS-3c/STM-1 mode (IOS_TX_SIG_MODE=0).

AIS Generation

Normal generation of SONET/SDH payload is suspended during transmission of the Line (Multiplex Section, MS) Alarm Indication Signal, LAIS, or the Path (Administrative Unit, AU) AIS signals, PAIS. AIS generation is controlled by the IOS_TX_LAIS and IOS_TX_PAIS registers.

If IOS_TX_LAIS or IOS_TX_PAIS=1, the entire payload (9396 or 2349 bytes) is filled with all-ones bytes.

Unequipped Generation

Unless AIS is active, unequipped SPE/VC (all SPE/VC bytes are filled with all-zeros) is generated if TX_UNEQ=1.

TOH/SOH Generation

The SONET TOH bytes are generally the same as the SDH SOH bytes. The following sections define the values generated for all TOH/SOH bytes. Where the byte names differ between SONET and SDH, the SONET name will be listed first. Entries that are blank in standard are SONET undefined or SDH non-standardized reserved bytes. The IOSL device fills these bytes with all zeros.

TABLE 4

Path RDI bit values

| PRDI-Auto | PRDI-ENH | RX-PAIS RX-LOP | RX-UNEQ | RX-PLM | G1 Bits 5, 6, and 7 |
|---|---|---|---|---|---|
| 0 | x | X | x | x | Tx_G1[2,0] |
| 1 | 0 | 1 | x | x | 100 |
|   |   | 0 | x | x | 000 |
|   | 1 | 1 | x | x | 101 |
|   |   | 0 | 1 | x | 110 |
|   |   | 0 | 0 | 1 | 010 |
|   |   | 0 | 0 | 0 | 001 |

If PRDI_AUTO=1, the values shown above are transmitted for a minimum of 20 frames. Once 20 frames have been transmitted with the same value, the value corresponding to the current state of the defect indication values listed in Table 1 will be transmitted.

Bit 8 of G1 (the LSB) is unused, and it is set to 0.

Other POH Bytes

The remaining POH bytes are not supported by the IOSL device and are transmitted as fixed all-zeros bytes. These include the path user channel (F2), the position indicator (H4), the path growth/user channel (Z3/F3), the path growth/path APS channel (Z4/K3), and the tandem connection monitoring (Z5/N1) bytes.

SONET/SDH Frame Generation

The SONET/SDH frame generation block creates an STS-3c/STM-1 by generating the Transport (Section) Overhead (TOH/SOH) bytes, filling the payload with bytes from SPE/VC, and scrambling all bytes of the SONET/SDH signal except for the first row of TOH/SOH bytes.

AIS Generation

Normal generation of TOH/SOH bytes is suspended during transmission of LAIS or PAIS. If IOS_TX_LAIS=1, the first 3 rows of the TOH/SOH are generated normally, but the remainder of the TOH/SOH (as well as all SPE/VC bytes) are transmitted as all-ones bytes. If IOS_TX_PAIS=1, all rows of the TOH/SOH are generated normally, except for the pointer bytes in row 4. The H1, H2, and H3 bytes (as well as all SPE/VC bytes) are transmitted as all-ones bytes.

Frame Bytes (A1 and A2)

The frame bytes are normally generated with the fixed patterns:

A1: 1111_0110=F6
A2: 0010_1000=28

For testing purposes, A1 and A2 can be generated with errors. If A1A2_ERR=0, no errors are inserted. When A1A2_ERR is one, then m consecutive frames (where m is the binary equivalent of A1A2_ERR_NUM[2:0]) in each group of 8 frames, is generated with A1 and A2 exclusive- ORed with the contents of A1A2_ERR_PAT[15:0]. The MSB of A1 is XORed with A1A2_ERR_PAT[15], and the LSB of A2 is XORed with A1A2_ERR_PAT[0].

Section Trace/Regenerator Section Trace (J0) and Section Growth/Spare (Z0) Section Trace.

Over periods of 16 consecutive frames, the IOSL device continuously transmits the 16-byte pattern contained in IOS_TX_J0_[15:0]_[7:0]. The bytes are transmitted in descending order starting with IOS_TX_J0_[15]_[7:0].

The ITU-T G.707 standard states that a 16-byte section trace frame containing the Section Access Point Identifier (SAPI) defined in clause3/G.831 should be transmitted continuously in consecutive J0 bytes. Note that only the frame start marker byte should contain a 1 in its MSB.

The Section Trace function is not currently defined for SONET. Unless a similar section trace is defined for SONET, all of the IOS_TX_J0 bytes should be filled with 0000_0001 so that a decimal 1 is transmitted continuously in J0.

Section Growth/Spare. The Z0 bytes are transmitted in order as the binary equivalent of 2 to 12 in STS-12c/STM-4 (IOS_TX_SIG_MODE=1) mode, or 2 to 3 in STS-3c/STM-1 (IOS_TX_SIG_MODE=0) mode (this is specified in GR-253).

Section BIP-8 (B1)

The B1 Bit Interleaved Parity 8 (BIP-8) is transmitted as even parity (normal) if IOS_B1_INV=0. Otherwise, odd parity (incorrect) is generated. The BIP-8 is calculated over all bits of the previous STS-3c/STM-1 frame after scrambling and placed into the B1 byte of the current frame before scrambling. By definition of BIP-8, the first bit of B1 provides parity over the first bit of all bytes of the previous frame, the second bit of B1 provides parity over the second bit of all bytes of the previous frame, etc.

Orderwire (E1 and E2) and Section User Channel (F1)

The orderwire bytes are defined for the purpose of carrying two 64 kb/s digitized voice signals. The F1 byte is available for use by the network provider. The transmit block accepts three serial inputs, IOS_TX_E1_DATA, IOS_TX_E2_DATA, and TX_F1_DATA, for insertion into the transmitted E1, E2, and F1 bytes. A single 64 kHz clock (IOS_TX_E1E2F1_CLK) is output from the IOSL device in order to provide a timing reference for these three serial inputs.

The first bit (the MSB) of these bytes should be aligned with the incoming frame start pulse, IOS_TX_FRAME_IN. The received E1, E2 and F1 bytes will be inserted into the outgoing SONET/SDH frame which follows the reception of the last bit of the E1, E2 and F1 bytes.

Data Communications Channels, DCC, (D1–D12)

There are two DCCs defined in the TOH/SOH. The Section/Regenerator Section DCC uses the D1, D2, and D3 bytes to create a 192 kb/s channel. The Line/Multiplex Section DCC uses bytes D4 through D12 to create a 576 kb/s channel. The Transmit Side accepts DCC data on two serial inputs, IOS_TX_SDCC_DATA and IOS_TX_LDCC_DATA. In order to assure bit synchronization, the Transmit Side outputs two clocks, IOS_TX_SDCC_CLK at 192 kHz and IOS_TX_LDCC_CLK at 576 kHz. The clock signals enable the retiming of bits from IOS_TX_SDCC_DATA and IOS_TX_LDCC_DATA into registers for inserting into the TOH/SOH. The IOS_TX_SDCC_DATA and IOS_TX_LDCC_DATA inputs should change on the falling edges of IOS_TX_SDCC_CLK and IOS_TX_LDCC_CLK, since the retiming is done on the rising edges.

Pointer Bytes (H1, H2) and Pointer Action Byte (H3)

The H1 and H2 bytes contain 3 fields. Because the SPE/VC is generated synchronously with the TOH, variable pointer generation is not required. Instead, active H1 and H2 bytes are generated with the fixed pointer value of 522 (decimal)=10_0000_1010(binary), and the H3 bytes are fixed at all-zeros. Thus, the J1 byte of the SPE/VC is placed into column 10 of row 1 in the STS-3c/STM-1 mode (IOS_TX_SIG_MODE=0).

AIS Generation. If IOS_TX_LAIS or TX_PAIS is active, the H1, H2, and H3 bytes are transmitted as all-ones. When IOS_TX_LAIS or TX_PAIS transitions so that both bits become 0, the IOSL device transmits the first H1 byte in the next frame with an enabled New Data Flag. Succeeding frames are generated with the NDF field disabled in the first H1 byte.

Non-AIS Generation. The first H1–H2 byte pair is transmitted as a normal pointer, with NDF=0110
SS=TX_SDH_PG, 0
Pointer Value=10_0000_1010 all other H1–H2 byte pairs are transmitted as concatenation indication bytes, with NDF=1001
SS=TX_SDH_PG, 0
Pointer Value=11_1111_1111.

Line/MS BIP-96/24 (B2)

In the following B2 description, the numbers vary slightly dependent upon the mode of the device (STS-12c mode vs. STS-3c). To describe the operation of both cases, the following convention will be used to identify the requirement that applies to each mode: STS-3c. There are 12 [3] B2 bytes in the TOH/SOH, and together they provide a BIP-96 [BIP-24] error detection capability.

Each B2 byte provides BIP-8 parity over bytes in 1 of 12 [3] groups of bytes in the previous frame. The B2 byte in column j, provides BIP-8 parity over bytes in the previous frame (except those in the first 3 rows of TOH/SOH) that appear in columns j+12k (j+3k), where k=0 through 89. The BIP-8 is transmitted as even parity (normal) if B2_INV=0. Otherwise, odd parity (incorrect) is generated. The BIP-8 values are calculated over bytes in the previous STS-3c/STM-1] frame before scrambling and placed into the B2 bytes of the current frame before scrambling.

APS Channel and Line/MS AIS/RDI (K1 and K2)

K1 and the 5 MSBs of K2 are used for automatic protection switching (APS) signaling. The 3 LSBs of K2 are used as an AIS or Remote Defect Indication (RDI) at the line/MS level, and in SONET, they are also used for APS signalling. The IOSL device inserts IOS_TX_K1_[7:0] in the transmitted KI bytes and IOS_TX_K2_[7:3] in the transmitted 5 MSBs of K2 bytes.

The 3 LSBs of K2 are controlled from 3 sources. In order of priority, these are

If TX_LAIS=1, they are transmitted as all-ones (as are all line/MS overhead bytes)
else if LRDI_INH=0 and if any of (IOS_RX_LOS AND NOT RX_LOS_INH), IOS_RX_LOF, IOS_RX_LOC or IOS_RX_LAIS=1, they are transmitted as 110. Any time this particular event is active, the K2 is set to 110 for a minimum of 20 frames.
else IOS_TX_K2_[2:0] is transmitted.

RX_LOS can be active high (IOS_RX_LOS_LEVEL=0, the default) or active low (IOS_RX_LOS_LEVEL=1). Internally, if IOS_RX_LOS_LEVEL=1, IOS_RX_LOS is inverted to produce IOS_RX_LOS. The requirements R6-180 through R6-182 of GR-253 specify that RDI should be inserted and removed within 125 μs of detection and removal of received LOS, LOF, or LAIS.

Synchronization Status (S1)

The 4 LSBs of this byte convey synchronization status messages. The transmitted S1 byte is set equal to IOS_TX_S1_[7:0].

Line/MS REI (M1)

The Receive Side monitors B2 bit errors in the received signal. The number of B2 errors detected each frame can range from 0 to 96 B2 bits per frame in STS-12c/STM-4 mode, or from 0 to 24 B2 bits per frame in STS-3c/STM-1 mode. The line/MS Remote Error Indication (REI) byte, the M1 byte, normally conveys the count of B2 errors detected in the received signal.

The user can force the transmission of REI error indications by setting TX_M1_ERR=1. This causes a count of either 24 (STS-3c/STM-1 modes) to be transmitted in the M1 byte. Else if LREI_INH=0, the M1 byte is set equal to the most recent B2 error count. Otherwise, the M1 byte is set to all zeros.

Growth/Undefined (Z1 and Z2)

The use of the Z1 and Z2 bytes is not standardized. The IOSL device fills these bytes with all-zeros.

Scrambling in HDLC Framing

The input is scrambled with a frame synchronous scrambling sequence generated from the polynomial $g(x)=x^7+x^6+1$. The scrambler is initialized to 1111111 at the beginning of the first SPE/VC byte (the byte in column 10 of row 1 in STS-3c/STM-1 mode), and it scrambles the entire SONET/SDH signal except for the first row of TOH/SOH. For testing purposes, the scrambler can be disabled by setting the SCRINH bit to 1.

As described above, the LAPS frames are encapsulated in the SPE/VC of the SDH/SONET frames. A LAPS frame can be contained across more that one Virtual Container, so called concatenation. The inserted pointer indicates the start of the virtual container, which is the payload.

Below describe the data processing in the receive direction, according to one embodiment of the present invention.

Processing of Data in the Receive Direction

T-to-R Loopback and LOC

The IOSL receive section can be configured to loopback the generated transmit signal if R_LOOP=1. Otherwise, the received signal from the SONET/SDH interface is selected. While in loopback, the TX_SONETCLK input is used to clock the receiver framer and other receiver circuitry. If loopback is not selected, the RX_SONETCLK input is used to clock this circuitry.

The RX_SONETCLK input is monitored for loss of clock using the TX_CLK input. If no transitions are detected on RX_SONETCLK for 16 periods of TX_CLK, the RX_LOC bit is set. It is cleared when transitions are detected. The RX_LOC_D delta bit is set if RX_LOC transitions from either a 0 to a 1, or from a 1 to a 0.

Transport Overhead Monitoring

The TOH/SOH monitoring block consists of J0, B2, K1K2, S1 and M1 monitoring. These TOH/SOH bytes are monitored for errors or changes in states.

J0 Monitoring

There are two modes of operation for J0 monitoring, one typically used in SONET applications, the other used in SDH applications. In the IOS_RX_J0=0 mode (SONET), J0 monitoring consists of examining the received J0 bytes for values that match consistently for 3 consecutive frames. When a consistent J0 value is received, it is written to IOS_RX_J0_[15]_[7:0].

In the IOS_RX_J0=1 case (SDH), the J0 byte is expected to contain a repeating 16-byte section trace frame that includes the Section Access Point Identifier. J0 monitoring consists of locking on to the start of the 16-byte section trace frame and examining the received section trace frames for values that match consistently for 3 consecutive section trace frames. When a consistent frame value is received, it is written to IOS_RX_J0_[15:0]_[7:0]. The first byte of the section trace frame (which contains the frame start marker) is written to IOS_RX_J0_[15]_[7:0].

Framing

The MSBs of all section trace frame bytes are 0, except for the MSB of the frame start marker byte. The J0 monitor framer searches for 15 consecutive J0 bytes that have a 0 in their MSB, followed by a J0 byte with a 1 in its MSB. When this pattern is found, the framer goes into frame, J0_OOF=0. Once the J0 monitor framer is in-frame, it remains in frame until 3 consecutive section trace frames are received with at least 1 MSB bit error. If IOS_RX_J0=0, the J0 frame indication is held in the In-frame state, IOS_J0_OOF=0. The IOS_J0_OOF_D delta bit is set when IOS_J0_OOF changes state.

Pattern Acceptance and Comparison

Once in frame, the J0 monitor block looks for 3 consecutive 16 byte (IOS_RX_J0=1) or 1 byte (IOS_RX_J0=0) section trace frames. When 3 consecutive identical frames are received, the accepted frame is stored in IOS_RX_J0_[15:0]_[7:0] (or IOS_RX_J0_[15]_[7:0] in the SONET mode). Accepted frames are compared to the previous contents of these registers. When a new value is stored, the IOS_RX_J0_D delta bit is set.

BIP-96 (B2) Checking

In the following B2 description, the numbers vary slightly dependent upon the mode of the device (STS-3c). To describe the operation of both cases, the following convention will be used to identify the requirement that applies to mode: STS-3c. The IOSL device checks the received B2 bytes for correct BIP-8 values. (The 12 [3] B2 bytes together form a BIP-96 [BIP-24].) Even parity BIP-96 [BIP-24] is calculated over all groups of 12 [3] bytes of each frame, except the first three rows of TOH (SOH in SONET and RSOH in SDH). The calculation is done on the received data after descrambling. This value is then compared to the B2 values in the following frame after descrambling. The comparison can result in from 0 to 96 [0 to 24] mismatches (B2 bit errors). The number of B2 bit errors detected each frame may be inserted into the transmitted M1 byte.

B2 Error Counting

The IOSL device contains a 20-bit B2 error counter that either counts every B2 bit error (if BIT_BLKCNT=0) or every frame with at least one B2 bit error (if BIT_BLKCNT=1). When the performance monitoring counters are latched (LATCH_EVENT transitions high), the value of this counter is latched to the B2_ERRCNT[19:0] register, and the B2 error counter is cleared. If there has been at least one B2 error since the last rising edge of LATCH_EVENT, then the B2 error second event bit, B2ERR_SECE, is set.

B2 Error Rate Threshold Blocks are applies.

For the purpose of determining whether or not the bit error rate of the received signal is above or below two different provisionable thresholds (the Signal Fail and the Signal Degrade conditions), the IOSL device provides two B2 error rate threshold blocks. If the SF block or the SD block determines that the error rate is above the threshold, it sets B2_ERR_SF or B2_ERR_SD. The delta bits B2_ERR_SF_D or B2_ERR_SD_D are set if the corresponding error rate bit changes value. For each error rate threshold block, the user may provision a BLOCK register and 2 pairs of THRESH and GROUP registers. In order to allow hysteresis in setting and clearing the state bits, each error rate threshold block has 1 pair of THRESH and GROUP registers for setting the state and 1 pair of THRESH and GROUP registers for clearing the state. Thus, the registers used in the error rate threshold blocks are while B2_ERR_SF=0, determine if it should be set using: B2_BLOCK_SF[7:0], B2_THRESH_SET_SF[7:0], and B2_GROUP_SET_SF[5:0]

while B2_ERR_SF=1, determine if it should be cleared using: B2_BLOCK_SF[7:0], B2_THRESH_CLR_SF[7:0], and B2_GROUP_CLR_SF[5:0]

while B2_ERR_SD=0, determine if it should be set using: B2_BLOCK_SD[15:0], B2_THRESH_SET_SD[5:0], and B2_GROUP_SET_SD[5:0]

while B2_ERR_SD=1, determine if it should be cleared using:
B2_BLOCK_SD[15:0], B2_THRESH_CLR_SD[5:0], and B2_GROUP_CLR_SD[5:0]

K1K2 Monitoring

The K1 and K2 bytes, which are used for sending Line/MS AIS or RDI and for APS signalling, are monitored for change in status.

Line/MS AIS Monitoring and LRDI Generation

The 3 LSBs of K2 can be used as a AIS or Remote Defect Indication (RDI) at the line/MS level.

If they are received as "111" for K2_CONSEC[3:01] consecutive frames, RX_LAIS is set, and the RX_LAIS_OUT output is high. If for K2_CONSEC[3:0] consecutive frames, they are not received as "111", then RX_LAIS and RX_LAIS_OUT are cleared. The RX_LAIS_D delta bit is set when RX_LAIS changes state.

Line/MS RDI Monitoring

The 3 LSBs of K2 are also monitored for K2_CONSEC [3:0] consecutive receptions or non-receptions of "110". When this is received, RX_LRDI is set or cleared. RX_LRDI_D is set when RX_LRDI changes state.

APS Monitoring

If the K1 byte and the 4 MSBs of the K2 byte, which are used sending APS requests and channel numbers, are received identically for 3 consecutive frames, their values are written to RX_K1_[7:0] and RX_K2_[7:4]. Accepted values are compared to the previous contents of these registers, and when a new 12-bit value is stored, the RX_K1_D delta bit is set.

The K1 byte is checked for instability. If, for 12 successive frames, no 3 consecutive frames are received with identical K1 bytes, the K1_UNSTAB bit is set. It is cleared when 3 consecutive identical K1 bytes are received. When K1_UNSTAB changes state, the K1_UNSTAB_D delta bit is set. Bits 3 down to 0 of K2 may contain APS mode information. These bits are monitored for K2_CONSEC [3:0] consecutive identical values. RX_K2_[3:0] is written when this occurs, unless the value of bits 2 and 1 of K2 is "11" (indicating Line/MS AIS or RDI). The RX_K2_D delta bit is set when a new value is written to RX_K2_[3:0].

The three delta bits associated with APS monitors, IOS_RX_K1_D, RX_K2_D and IOS_K1_UNSTAB_D all contribute to an APS interrupt signal, APS_INTB. In addition, these three deltas also contribute to the standard summary interrupt signal, INTB.

S1 Monitoring

The 4 LSBs of received S1 bytes are monitored for consistent values in either 8 consecutive frames in the SONET mode, IOS_RX_SDH_S1=0, or 3 consecutive frames in the SDH (IOS_RX_SDH_S1=1) mode. When these bits contain a consistent synchronization status message, the accepted value is written to RX_S1_[3:0]. Accepted values are compared to the previous contents of this register, and when a new value is stored, the IOS_RX_S1_D delta bit is set. The S1 byte is also checked for message failure. If no message has met the above validation criterion (whether it is the same or different from the last accepted value) at any time since the last rising edge of LATCH_EVENT, then the S1 fail second event bit, S1_FAIL_SECE, is set.

M1 Monitoring

The M1 byte indicates the number of B2 errors that were detected by the remote terminal in its received signal. The IOSL device contains a 20-bit M1 error counter that either counts every error indicated by M1 (if BIT_BLKCNT=0) or every frame received with M1 not equal to 0 (if BIT_BLKCNT=1). When IOS_RX_SIG_MODE=1, the valid values of M1 for BIT_BLKCNT=0 are 0 to 96; any other value is interpreted as 0 errors. When IOS_RX_SIG_MODE=0 and BIT_BLKCNT=0, the valid values of M1 are 0 to 24; any other value is interpreted as 0 errors. When the performance monitoring counters are latched, the value of this counter is latched to the M1_ERRCNT[19:0] register, and the M1 error counter is cleared.

If there has been at least one received M1 error indication since the last rising edge of LATCH_EVENT, then the M1 error second event bit, M1_ERR_SECE, is set.

Transport Overhead Drop

The TOH/SOH drop block outputs the received E1, F1, and E2 bytes and 2 serial DCC channels.

Order-wire (E1 and E2) and Section User Channel (F1)

The three serial outputs, IOS_RX_E1_DATA, IOS_RX_E2_DATA, and IOS_RX_F1_DATA, contain the values of the received E1, E2, and F1 bytes. A single 64 kHz clock reference output (IOS_RX_E1E2F1_CLK) is provided as well. The MSB of the E1, E2 and F1 bytes appears in the first 64 kHz clock cycle after a rising edge of RX_FRAME_OUT.

Data Communications Channels, DCC, (D1–D12)

There are two DCCs defined in the TOH/SOH. The Section/Regenerator Section DCC uses the D1, D2, and D3 bytes to create a 192 kb/s channel. The Line/Multiplex Section DCC uses bytes D4 through D12 to create a 576 kb/s channel. The TOH/SOH drop block outputs DCC data on two serial channels, RX_SDCC_DATA and RX_LDCC_DATA. These channels are synchronous to the outputs IOS_RX_SDCC_CLK and IOS_RX_LDCC_CLK. The DCC data outputs change on the falling edges of RX_SDCC_CLK and RX_LDCC_CLK.

Pointer State Determination or Pointer Interpretation

Pointer state determination involves examining H1–H2 bytes to establish the state of the STS-3c/AU-4 received pointer.

State Transition Rules

In the following pointer state determination description, the numbers vary slightly dependent upon the mode of the device (STS-3c). To describe the operation of both cases, the following convention will be used to identify the requirement that applies to mode: STS-3c.

The first pair of H1–H2 bytes contain the STS-3c/AU-4 pointer. They are monitored and are considered to be in 1 of the following 3 states:

Normal (NORM=00)

Alarm Indication Signal (AIS=01)

Loss of Pointer (LOP=10)

The remaining 11 [2] pairs of H1–H2 bytes are monitored for correct concatenation indication. They are considered to be in 1 of the following 3 states:

Concatenated (CONC=11)
Alarm Indication Signal (AISC=01)
Loss of Pointer (LOPC=10)

The individual states are stored in IOS_PTR_STATE_[1:12]_[1:0] [IOS_PTR_STATE_[1:3]_[1:0]], where IOS_PTR_STATE_[i]_[1:0] indicates the state of the i'th pair of H1–H2 bytes. The states of individual pairs of H1–H2 bytes are then combined to determine the state of the STS-3c/AU-4 pointer State of STS-3c/AU-4 Pointer The IOSL device supplies the register state bits IOS_RX_PAIS and IOS_RX_LOP that indicate the pointer state of the received STS-3c/AU-4 pointer. These may be in 1 of 3 states:
Normal (IOS_RX_PAIS=0 and RX_LOP=0)–IOS_PTR_STATE_[1]_[1:0] is NORM (00) and all other PTR_STATE_[i]_[1:0] are CONC (11).
Path/AU AIS (IOS_RX_PAIS=1 and RX_LOP=0)–All PTR_STATE_[i]_[1:0] are AIS or AISC (01)·Loss of Pointer (IOS_RX_PAIS=0 and IOS_RX_LOP=1)
All others (The PTR_STATE_[i]_[1:0] values do not satisfy either Normal or Path/AU AIS criteria).

The IOS_RX_PAIS and IOS_RX_LOP signals contribute to the Path Remote Defect Indication (PRDI). Changes in these state values are indicated by the IOS_RX_PAIS_D and IOS_RX_LOP_D delta bits.

Pointer Interpretation Unit

In the pointer interpretation unit 28 in FIG. 7, the first H1–H2 byte pair is interpreted to locate the start of the SPE/VC. The rules for pointer interpretation are:
1. During normal operation, the pointer locates the start of the SPE/VC.
2. Any variation from the current accepted pointer is ignored unless a consistent new value is received 3 times consecutively, or it is preceded by one of the rules 3, 4, or 5. Any consistent new value received 3 times consecutively overrides rules 3 or 4.
3. In the case of IOS_RX_SDH_PI=0, if at least 3 out of 4 of the NDF bits match the disabled indication (0110) and at least 8 out of 10 of the pointer value bits match the current accepted pointer with its I-bits inverted, a positive justification is indicated. The byte following the H3 byte is considered a positive stuff byte, and the current accepted pointer value is incremented by 1 (mod 783).
In the case of IOS_RX_SDH_PI=1, if at least 3 out of 4 of the NDF bits match the disabled indication (0110), 3 or more of the pointer value I-bits and 2 or fewer of the pointer value D-bits match the current accepted pointer with all its bits inverted, and either the received SS-bits are 10 or IOS_RX_SS_EN=0, a positive justification is indicated. The byte following the H3 byte is considered a positive stuff byte, and the current accepted pointer value is incremented by 1 (mod 783).
4. In the case of IOS_RX_SDH_PI=0, if at least 3 out of 4 of the NDF bits match the disabled indication (0110) and at least 8 out of 10 of the pointer value bits match the current accepted pointer with its D-bits inverted, a negative justification is indicated. The H3 byte is considered a negative stuff byte (it is part of the SPE), and the current accepted pointer value is decremented by 1 (mod 783).
In the case of IOS_RX_SDH_PI=1, if at least 3 out of 4 of the NDF bits match the disabled indication (0110), 3 or more of the pointer value D-bits and 2 or fewer of the pointer value I-bits match the current accepted pointer with all its bits inverted, and either the received SS-bits are 10 or IOS_RX_SS_EN=0, a negative justification is indicated. The H3 byte is considered a negative stuff byte (it is part of the VC), and the current accepted pointer value is decremented by 1 (mod 783).
5. In the case of IOS_RX_SDH_PI=0, if at least 3 out of 4 of the NDF bits match the enabled indication (1001), and the pointer value is between 0 and 782, the received pointer replaces the current accepted pointer value.
For IOS_RX_SDH_PI=1, if at least 3 out of 4 of the NDF bits match the enabled indication (1001), the pointer value is between 0 and 782, and either the received SS-bits are 10 or IOS_RX_SS_EN=0, the received pointer replaces the current accepted pointer value.

Using these pointer interpretation rules, the Pointer Interpreter block determines the location of SPE/VC payload and POH bytes.

Pointer Processing

Regarding the pointer tracking algorithm implemented in the IOSL device device. The pointer tracking state machine is based on the pointer tracking state machine found in the ITU-T requirements, and is also valid for both Bellcore and ANSI. The AIS to LOP transition of the state machine does not occur in Bellcore mode (i.e., set by setting the BELLCORE bit to logic 1).

Four pointer tracking state machines are employed, one for each AU-4/STS-3c. The pointer tracking uses the H11 and H21 bytes. The pointer is extracted from the concatenation of the H1n and H2n bytes, and is interpreted as follows:
N=New Data Flag Bits. This is interpreted as enabled=1001 or 0001/1101/1011/1000, and normal or disabled=0110 or 1110/0010/0100/0111 (i.e., a single-bit error is tolerated).
SS=Size bits used in pointer tracking state machine interpretation if enabled by BELLCORE control bit being set to 0. When BELLCORE is set to 1 these bits are ignored, but when it is set to 0 these bits are expected to be 10.
I=Increment Bits defined as bit 7 of H1n and bits 1, 3, 5 and 7 of H2n.
D=Decrement Bits defined as bit 8 of H1n and bits 2, 4, 6 and 8 of H2n.
Negative Justification: Inverted 5 D-bits and accept majority rule. The 8 of 10 objective of O3-92 in [GR-253] can be enabled by setting the Just ITU bit in OR#Conf3 to 0.
Positive Justification: Inverted 5 I-bits and accept majority rule. The 8 of 10 objective of O3-92 in [GR-253] can be enabled by setting the Just ITU bit in OR#Conf3 to 0.

For STM-1/STS-3c operation, the pointer is a binary number with the range of 0 to 782 (decimal). It is a 10-bit value derived from the two least significant bits of the H1 byte, with the H2 byte concatenated, to form an offset in 3-byte counts from the H3 byte location. For example, for an STM-1 signal, a pointer value of 0 indicates that the VC-4 starts in the byte location 3 bytes after the H3 byte, whereas an offset of 87 indicates that the VC-4 starts three bytes after the K2 byte.

In STM-4/STS-12 modes there are four byte-interleaved AU-4s, so there are four H1/H2 byte pairs for determining the beginning (i.e., the J1 byte location) of their respective VC-4s. The operation of the four pointer tracking state machines in this case is identical to that for 4×STM-1/STS-3c operation.

When dealing with STS-12c/STM-4c, the pointer tracking state machine for macro 1 is used to locate the beginning of the VC-4–4c. The pointer tracking uses the H11 and H21 bytes. The pointer is extracted from the concatenation of the H11 and H21 bytes, and is interpreted as shown above. However, the offset that is formed represents the number of 12-byte counts from the H3 byte location. For example, for an STM-12c signal, a pointer value of 0 indicates that the VC-4 starts in the byte location twelve bytes after the H3 byte, whereas an offset of 87 indicates that the VC-4 starts twelve bytes after the K2 byte. The concatenation indication bytes are also examined in the corresponding macros (macros 2–4) and are monitored for LOP and HPAIS per the state machine in Annex C of [G.783]. The state diagram (below) illustrates the concatenation indicator state transition. Please refer to [G.783] for definitions of the transitions.

In addition, 8-bit counters are provided for counting positive and negative justification events, as well as NDF events. Status bits are provided for indicating the detection of negative justification, positive justification, NDF, invalid pointer, new pointer and concatenation indication. When the LOP or LOPC states are entered as indicated in the above figures, the LOP interrupt request bit in the corresponding OR#IRQ2 register will be set. Likewise if the AIS or AISC states are entered the corresponding HPAIS interrupt request bit will become set.

Path Overhead Monitoring

The POH monitoring block consists of J1, B3, C2, and G1 monitoring. These POH bytes are monitored for errors or changes in states.

Path Trace (J1) Capture/Monitor

As with J1 insertion, the IOSL device supports two methods of Path Trace (J1) capture. The first, typically used in SONET applications, captures 64 consecutive J1 bytes in the STS-3c/AU-4. The second, used in SDH applications, looks for a repeating 16 consecutive J1 byte pattern. When it has detected a consistent 16 byte pattern for three consecutive instances, the J1 pattern is stored in designated registers.

SONET J1 Capture

When IOS_RX_SDH_J1=0 (SONET mode), the IOSL device can be provisioned to capture a sample of the path trace message. When J1_CAP transitions from 0 to 1, the IOSL device captures 64 consecutive J1 bytes from the specified tributary and writes them to IOS_RX_J1_[63:0]_[7:0].

No path trace frame structure is defined for SONET, but GR-253 does recommend that the 64-byte sequence consist of a string of ASCII characters padded out to 62 bytes with NULL characters (00) and terminated with <CR> (0D) and <LF> (0A) bytes. If the J1_CRLF bit is set, the IOSL device captures the first 64 byte string it receives in the J1 byte position that ends with {0D, 0A}. If the J1_CRLF bit is 0, the IOSL device captures the next 64 J1 bytes without regard to their content. On completion of the capture, the IOSL device sets the J1_CAP_E event bit.

16-Byte J1 Monitoring

If IOS_RX_SDH_J1=1 (normally used in the SDH mode), the J1 bytes are expected to contain a repeating 16-byte path trace frame that includes the PAPI. In this mode, the J1_CAP, J1_CRLF, and J1_CAP_E bits are not used. J1 monitoring consists of locking on to the start of the 16-byte path trace frame and examining the received path trace frames for values that match consistently for 3 consecutive path trace frames. When a consistent frame value is received, it is written to IOS_RX_J1_[15:0]_[7:0]. The first byte of the path trace frame (which contains the frame start marker) is written to IOS_RX_J1_[15]_[7:0].

Framing. The MSBs of all path trace frame bytes are 0, except for the MSB of the frame start marker byte. The J1 monitor framer searches for 15 consecutive J1 bytes that have a 0 in their MSB, followed by a J1 byte with a 1 in its MSB. When this pattern is found, the framer goes into frame, J1_OOF=0. Once the J1 monitor framer is in-frame, it remains in frame until 3 consecutive path trace frames are received with at least 1 MSB bit error. (In the SONET mode, the J1 frame indication is held in the In-frame state, J1_OOF=0.) The J1_OOF_D delta bit is set when J1_OOF changes state.

Pattern Acceptance and Comparison. Once in frame, the J1 monitor block looks for 3 consecutive 16-byte path trace frames. When 3 consecutive identical frames are received, the accepted frame is stored in IOS_RX_J1_[15:0]_[7:0]. Accepted frames are compared to the previous contents of these registers. When a new value is stored, the RX_J1_D delta bit is set.

BIP-8 (B3) Checking

The IOSL device checks the received B3 bytes for correct BIP-8 values. Even parity BIP-8 is calculated over all bits in the SPE/VC (including the POH) each frame. These values are then compared to the B3 values received in the following frame. The comparison can result in from 0 to 8 mismatches (B3 bit errors). This value may be inserted into the Transmit Side G1 byte.

The IOSL device contains a 16-bit B3 error counter that either counts every B3 bit error (if BIT_BLKCNT=0) or every frame with at least one B3 bit error (if BIT_BLKCNT=1). When the performance monitoring counters are latched (LATCH_EVENT transitions high), the value of this counter is latched to the B3ERRCNT_[15:0] register, and the B3 error counter is cleared. If there has been at least one B3 error since the last rising edge of LATCH_EVENT, then the B3 error second event. bit, B3ERR_SECE, is set.

Signal Label (C2) Monitoring

The received C2 bytes are monitored so that reception of the correct type of payload can be verified. When a consistent C2 value is received for 5 consecutive frames, the accepted value is written to IOS_RX_C2[7:0]. The IOS_RX_C2_D delta bit is set when a new C2 value is accepted.

The expected value of the received C2 bytes is provisioned in EXP-C2[7:0]. If the current accepted value does not match the expected value, and the accepted value is NOT the all zeros Unequipped label,
the 01 (hex) Equipped—non-specific label,
the FC(hex) payload defect label,
the FF(hex) reserved label,
then the Payload Label Mismatch register bit, IOS_RX_PLM, is set high.

If the current accepted value is the all zeros Unequipped label, and the provisioned EXP_C2[7:0] !=00(hex), then the Unequipped register bit, IOS_RX_UNEQ, is set high.

The IOS_RX_PLM and IOS_RX_UNEQ signals contribute to the insertion of Path RDI on the Transmit Side. When IOS_RX_PLM or IOS_RX_UNEQ changes state, the IOS_RX_PLM_D or the IOS_RX_UNEQ_D delta bit is set.

Path Status (G1) Monitoring

Path REI Monitoring

Bits 1 through 4 (the 4 MSBs) of the path status byte indicate the number of B3 errors that were detected by the remote terminal in its received SPE/VC signal. Only the binary values between 0 and 8 are legitimate. If a value greater than 8 is received, it is interpreted as 0 errors (as is specified in GR-253 and ITU-T Recommendation G.707).

The IOSL device contains a 16-bit G1 error counter that either counts every error indicated by G1 (if BIT_BLKCNT=0) or every frame received with the first 4 bits of G1 not equal to 0 (if BIT_BLKCNT=1). When the performance monitoring counters are latched (LATCH_EVENT transitions high), the value of this counter is latched to the G1_ERRCNT[15:0] register, and the G1 error counter is cleared.

If there has been at least one received G1 error indication since the last rising edge of LATCH_EVENT, then the G1 error second event bit, G1ERR_SECE, is set.

Path RDI Monitoring

The IOSL device can be provisioned to monitor bit 5 of G1 (RDI-P indicator), if IOS_RX_PRDI5=1; or bits 5, 6 and 7 of G1 (enhanced RDI-P indicator), if IOS_RX_PRDI5=0. Monitoring consists of checking for G1_CONSEC[3:0] consecutive received values of the monitored bit(s) that are identical. When a consistent value is received, bits 5, 6 and 7 of G1 are written to IOS_RX_G1[2:0]. Accepted values are compared to the previous contents of this register. (All 3 bits are written, but if IOS_RX_PRDI5=1, only G1 bit 5 and IOS_RX_G1[2] are involved in the comparisons.) When a new value is stored, the IOS_RX_G1_D delta bit is set.

Other POH Bytes

The remaining POH bytes are not monitored by the IOSL device. These include the path user channel (F2), the position indicator (H4), the path growth/user channel (Z3/F3), the path growth/path APS channel (Z4/K3), and the tandem connection monitoring (Z5/N1) bytes.

Receive Payload Descrambling

After the payload is extracted from the SONET/SDH signal, the payload data is descrambled using a self-synchronizing $X^{43}+1$ descrambler 29. In all modes, register IOS_RX_DSCR_INH controls the operation of the descrambler. When IOS_RX_DSCR_INH=0 (the default), the descrambler is enabled. When IOS_RX_DSCR_INH=1, operation of the descrambler is inhibited. The IOSL device provides a self-synchronizing descrambler based on the following generator polynomial: $X^{43}+1$ Receive LAPS Processing At this point the SPE has been extracted from the SONET/SDH frame, and is passed on the LAPS processor for further processing. In IOS mode (IOS_RX_POS=1), the LAPS processing provides the extraction of LAPS packets/frames from the SPE.

LAPS Deframer

LAPS frames are extracted from the SPE payload by identifying the Flag Sequence (0x7e) that begins/ends a frame.

The IOSL device examines each octet of the payload. When an octet with bit pattern 0x7e is discovered, the IOSL device recognizes this as the start/end of a packet. The octets that follow this Flag Sequence are then examined. If these are also 0x7e, they are Flag Sequences used to fill the Inter-Packet gap, and are discarded. The first octet NOT equal to 0x7e that follows the initial Flag Sequence is considered the first octet of the LAPS frame. After the start of frame flag, the IOSL device continues to examine each octet of the payload for the Flag Sequence. If it locates the bit pattern 0x7e and the immediately preceding octet is Control Escape (0x7d), the frame is aborted. Otherwise, a normal end of the current frame is declared. In the special case when termination of the FCS field is inhibited, a minimum of two Flag Sequences must be detected between frames.

Removal of Transparency Byte Stuffing

The IOSL device reverses the transparency byte stuffing process to recover the original packet stream. The FIFO underflow byte sequence, which may be inserted by the transmit side during periods of FIFO underflow, will be detected and removed during the transparency processing if IOS_RX_POS_FIFOUNDR_MODE=1. The default value is disabled, IOS_RX_IOS_FIFOUNDR_MODE=0. The special FIFO underflow byte code is programmed using register IOS_RX_IOS_FIFOUNDR_BYTE[7:0].

Underflow Byte Removal

In IOS mode, if IOS_RX_IOS_FIFOUNDR_MODE=1, bytes that match the FIFO underflow byte code (IOS_RX_IOS_FIFOUNDR_BYTE[7:0]) are discarded if they are not immediately preceded by the Control Escape code (0x7d).

Errored Frames

In IOS mode (IOS_RX_IOS=1), a special byte code (0x7d7e) is utilized in IOS mode to indicate that a frame has been aborted. If this byte code is received, the frame that contains it is aborted. No further octets from the packet are sent to the FIFO, and if the packet is transmitted to the Link Layer device, it is marked as errored.

The IOSL device contains an 8-bit error counter that counts every packet in which the abort sequence is detected. When the performance monitoring counters are latched (LATCH_EVENT transitions high), the value of this counter is latched to the IOS_RX_IOS_PABORT_ERRCNT[7:0] register, and the packet abort error counter is cleared.

If there has been at least one packet abort error since the last rising edge of LATCH_EVENT, then the packet abort error second event bit, IOS_RX_IOS_PABORT_ERR_SECE, is set.

As an alternative, a packet can also be aborted by inverting the FCS bytes. This will appear to the IOSL device Receive LAPS Processor as simply an FCS error, and is handled as described in the following section.

The IOSL device also, as an option, views a packet as being errored and marks it accordingly if it violates minimum or maximum packet sizes. The packet sizes refer to the size of the packets output from the IOSL device only, and do not include the dropped flag sequence, address, control, transparency, FIFO underflow and FCS bytes. These minimum and maximum sizes are programmable via the management interface.

Register IOS_RX_IOS_PMIN[3:0] contains the minimum packet size. The default value of this register is 0. Register IOS_RX_IOS_PMAX[15:0] contains the maximum packet size. The default value of this register is 0x05E0.

The IOSL device disables/enables minimum and maximum size packet checking when instructed to through the management interface. Registers IOS_RX_IOS_PMIN_ENB and IOS_RX_IOS_PMAX_ENB (both default to 0) control how violations of the minimum and maximum packet sizes are handled. When either is set to 1, any violation of the corresponding packet size restriction is marked as errored.

The IOSL device contains two 8-bit error counters that count every violation of the maximum and minimum packet size limits. When the performance monitoring counters are latched (LATCH_EVENT transitions high), the value of these counters are latched to the IOS_RX_IOS_PMIN_ERRCNT[7:0] and IOS_RX_IOS_PMAX_ERRCNT[7:0] registers, and the packet size violation counters are cleared.

If there has been at least one packet size violation error since the last rising edge of LATCH_EVENT, then the appropriate packet size violation second event bit, IOS_RX_IOS_PMIN_ERR_SECE or IOS_RX_IOS_PMAX_ERR_SECE, is set.

Frame Check Sequence (FCS) Field

In IOS mode (IOS_RX_IOS=1), an FCS is then calculated and checked against the FCS bytes at the end of each frame. This option is controlled by register IOS_RX_IOS_FCS_INH. A value of IOS_RX_IOS_FCS_INH=0 enables the FCS. A value of IOS_RX_IOS_FCS_INH=1 disables it. only a 32 bit check sequence (CRC-32) is applied. IOS_RX_IOS_FCS_MODE=0 places the device in FCS-32 mode, The IOSL device provides CRC-32 functionality, using the following generator polynomial:
$1+x+x^2+x^4+x^5+x^7+x^8+x^{10}+x^{11}+x^{12}+x^{16}+x^{22}+x^{23}+x^{26}+x^{32}$.

The FCS field is calculated over all bits frame, except the Flag Sequence and the FCS field itself.

If IOS_RX_IOS_FCS_BIT_ORDR=0 (the default), the received data is read into the shift register in big endian bit order (MSB first). If IOS_RX_IOS_FCS_BIT_ORDR=1, the received data is read into the shift register in little endian bit order (LSB first). In either case, the data is restored to big endian order for processing after the FCS calculation.

The resulting FCS is compared against the value in the received FCS field. If an error is detected, the management control interface is notified, the appropriate counter incremented, and the last word of the packet is marked as errored in the FIFO. The IOSL device contains a 20-bit FCS error counter that counts every FCS CRC violation. When the performance monitoring counters are latched (LATCH_EVENT transitions high), the value of this counter is latched to the IOS_RX_IOS_FCS_ERRCNT[19:0] register, and the FCS error counter is cleared. If there has been at least one FCS error since the last rising edge of LATCH_EVENT, then the FCS error second event bit, IOS_RX_IOS_FCS_ERR_SECE, is set.

Following FCS checking, the FCS bytes are terminated (they are not stored in the FIFO). If the FCS checking is disabled via the management interface, the last 2 or 4 bytes are sent on to the FIFO. Should an FCS error be detected, the packet is marked as errored (RX_ERR) when transmitted to the Link Layer device.

LAPS Frame Termination

In IOS mode (IOS_RX_IOS=1), after FCS calculation, the following LAPS bytes are monitored and optionally terminated:

Flag Sequence

All occurrences of the Flag Sequence, used for frame delineation and inter-frame fill purposes are deleted. The start and end of frame information is retained by the IOSL device and transmitted to the Link Layer via the RX_SOP and RX_EOP signals.

Address and Control Bytes

The address and control bytes (the first two bytes of the LAPS frame following the Flag Sequence) are monitored by the IOSL device. For the first embodiment of the invention, monitoring consists of checking for the valid Address and Control fields (0xFF03); and for the second embodiment of the invention, monitoring consists of checking for the valid Address and Control fields (0x0403) or (0xFF03). If no match is detected, this field is assumed to be compressed and was not sent. If invalid values are detected, these two bytes are not dropped, and are passed on the Link Layer via the IOS interface. The management control interface is notified of the detection of invalid Address and Control fields by setting IOS_RX_IOS_ADRCTL_INVALID=1. Changes-in the state of IOS_RX_IOS_ADRCTL_INVALID are indicated by setting its corresponding delta bit IOS_RX_IOS_ADRCTL_INVALID_D to 1. If valid Address and Control fields (0x0403) or (0xFF03) are detected, the IOSL device terminates these two bytes, and does not pass them on to the RX FIFO. The deletion of valid address and control bytes can be inhibited by setting IOS_RX_IOS_ADRCTL_DROP_INH=1. The default value of this register is 0 (automatic drop enabled).

FCS Bytes

As mentioned in the FCS section, the four FCS bytes are also terminated by the IOSL device. If the FCS checking is disabled via the management control interface (IOS_RX_IOS_FCS_INH=1), this termination is also disabled, and the last four bytes in the LAPS frame are sent on to the Link Layer.

Receive FIFO Interface

System Side Packet Loopback

The IOSL device provides the capability for the user to loopback the packets received via the System Interface.

When SYS_T_TO_R_LOOP=1, the packets received from the Link Layer device are routed from the transmit FIFO directly to the receive FIFO, and output back to the Link Layer device that originated the cell data. When SYS_T_TO_R_LOOP is set to 0, the packets data received within the SONET/SDH line signals are transmitted to the receive FIFOs and then out the System Interface.

FIFO Processing

The IOSL device writes packets data into the FIFO in preparation for output via the Receive System Inter-face to the Link Layer device. The FIFO holds 256 octets. Along with the packet, the following indicators, when applicable, must accompany each word in the FIFO: start of packet, end of packet, if end of packet, how many octets in word (1 or 2), and whether or not the packet is errored. Once an error has been detected in a packet, no further bytes from that packet are loaded into the FIFO. The state of the FIFO is monitored by the IOSL device. FIFO overflow events are reported to the management control interface by setting IOS_RX_FIFOOVER_E=1. The occurrence of a FIFO overflow also causes the appropriate performance monitoring counter to be incremented.

The IOSL device contains an 8-bit FIFO overflow error counter that counts every packet affected by a FIFO overflow event. When the performance monitoring counters are latched (LATCH_EVENT transitions high), the value of this counter is latched to the IOS_RX_FIFOOVER_ERRCNT[7:0] register, and the FIFO overflow error counter is cleared.

If there has been at least one FIFO overflow event since the last rising edge of LATCH_EVENT, then the FIFO overflow error event bit, IOS_RX_FIFOOVER_ERR_SECE, is set.

Once an overflow error has been detected, no further bytes from the packet are sent to the FIFO. In the IOS mode (IOS_RX_IOS=1), the last word of the packet is marked as errored (RX_ERR).

This FIFO immediately precedes the Receive System compatible interface. Its purpose is to perform the rate matching function between the SONET clock domain and the Link Layer clock domain.

Errored Packet Handling

In IOS mode (IOS_RX_IOS=1), the IOSL device will mark as errored any packets that have been corrupted by FIFO overflow events, using RX_ERR. An invalid frame is a frame which:

a) is not properly bounded by two flags; or
b) has fewer than eight octets between flags of frames; or
c) contains a frame check sequence error; or
d) contains a service access point identifier (see A.3.3 of ITU-T X.85) which is mismatched or not supported by the receiver; or
e) contains an unrecognized Control field value; or
f) ends with a sequence of more than six "1" bits.

Invalid frames shall be discarded without notification to the sender. No action is taken as the result of that frame.

Receive Data Parity

As per the MAC-PHY specifications, the IOSL device provides a parity check bit that accompanies each one or two octet word (IOS_RX_SYS_DAT[15:0]) transmitted to the Link Layer device. This parity check bit is present on pin RX_PRTY. This bit provides an odd parity check as a default (IOS_RX_PRTY_MODE=0). Even parity is provided if IOS_RX_PRTY_MODE=1.

Management Control Interface

Below describes the Management control Interface to the IOSL device and defines the address of all registers that are available for reading or writing by an external microprocessor.

The MSB of the microprocessor bus address, ADDR[8:0], designates whether the map is associated with the Transmit (ADDR[8]=0) or Receive (ADDR[8]=1) direction. ADDR [7:0] indicate the specific map and these values are identified with the following detailed descriptions of each map. The Common Configuration and Status Map is has ADDR[8]=0.

Interrupt or Polled Operation

The Management Control Interface can be operated in either an interrupt driven or a polled mode. In both modes, the IOSL device register bit SUM_INT in address 0x002 of the Common Configuration and Summary Status Map can be used to determine whether or not changes have occurred in the state of monitoring registers in the IOSL device.

Interrupt Sources

Transmit Side

The Transmit Side register maps are almost entirely provisioning parameters that determine the composition of the SONET/SDH signal and provide the LAPS, SONET/SDH POH, and SONET/SDH TOH/SOH values. In addition to these provisioning parameters, the Transmit Side register map includes System Interface and General Purpose I/O monitors. If any of these indications are active, the SUM_INT bit in register 0x002 will be high (logic 1). If SUM_INT_MASK=0, the interrupt output for the microprocessor interface, INTB, becomes active (logic 0).

Receive Side

Table (TBD) also contains summary status bits for the Receive Side in register 0x005. These bits contribute to the SUM_INT bit in register 0x002. If any of the summary status bits is "1" and the corresponding mask bit is "0", then the SUM_INT bit will be set to "1".

The summary status bits in registers 0x005 of Table (TBD) are "1" if one or more of the corresponding group of bits in Table (TBD) is "1". Individual TOH/SOH delta and second event bits can be masked (Table (TBD), addresses 0x104–0x106).

Interrupt Driven

In an interrupt driven mode, the SUM_INT_MASK bit in register 0x006 of the Common Configuration and Summary Status Map should be cleared (to logic 0). This allows the INTB output to become active (logic 0). This output is INTB=!(!SUM_INT_MASK && SUM_INT) In addition, the IOS_RX_APS_INT_MASK bits of the Receive side should be cleared (to logic 0). This allows the APS_INTB output to become active (logic 0). This output is APS_INTB=!(! IOS_RX_APS_INT_MASK && IOS_RX_APS_INT).

If an interrupt occurs, the microprocessor can first read the summary status registers, 0x004–0x005 to determine the class(es) of interrupt source(s) that is active, and then read the specific registers in that class(es) to determine the exact cause of the interrupt.

Polled Mode

The SUM_INT_MASK and IOS_RX_APS_INT_MASK bits should be set (to logic 1), to suppress all hardware interrupts and operate in a polled mode. In this mode, the IOSL device outputs INTB and APS_INTB are held in the inactive (logic 1) state. Note that the SUM_INT_MASK and IOS_RX_APS_INT_MASK bits do not affect the state of the register bits SUM_INT and IOS_RX_APS_INT. These bits can be polled to determine if further register interrogation is needed.

Microprocessor Interface

The Microprocessor Interface interfaces the IOSL device to a system CPU. The Microprocessor Interface enables the system CPU to access all registers within the IOSL device. The Microprocessor Interface is capable of operating in either an interrupt driven or a polled mode. In the interrupt mode, the IOSL device is capable of supporting multiple Interrupt Sources. The IOSL device is capable of masking out any of the interrupts in either Interrupt mode.

Compatibility with the Older PPP over SDH/SONET Devices

Figure 10:
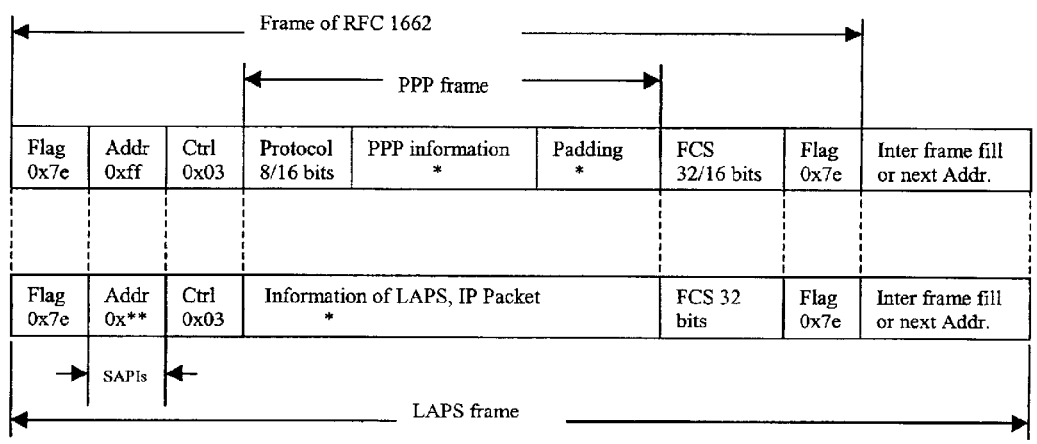
FIG. 10 is a comparison between the frame format of RFC 2615 and that of the first embodiment of the present invention.

FIG. 10 is a comparison between the frame format of RFC 2615 and that of the first embodiment of the present invention. As shown in FIG. 10, if the SAPI is set to 255, then the format of the LAPS frame is almost identical to that of PPP/HDLC, so the PPP packets can be processed by the data transmission apparatus of the present invention, and transmitted the extracted PPP packets to the network layer for PPP processing, without making any change in the configuration of the IP over SDH using LAPS framer/de-framer.

Figure 13:
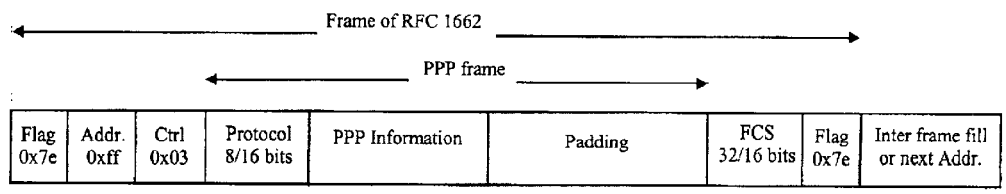
FIG. 13 is a comparison between the frame format of RFC 2615 and that of the second embodiment of the present invention.
Figure 13:
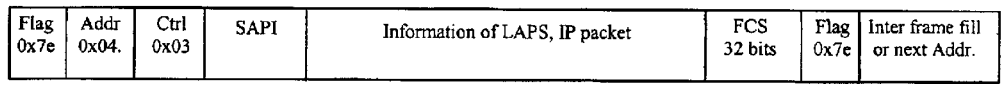

FIG. 13 is a comparison between the frame format of RFC 2615 and that of the second embodiment of the present invention. As shown in FIG. 13, if the frame type inicator in the address field is set to 255 and the value of the SDH/SONET path signal label is required to change from 24 (18 hex) to 22 (16 hex), then the format of the LAPS frame is almost identical to that of PPP/HDLC, so the PPP packets can be processed by the data transmission apparatus of the present invention, and transmitted the extracted PPP packets to the network layer for PPP processing, without making any change in the configuration of the IP over SDH using LAPS framer/de-framer. The implementation of the first embodiment and the second embodiment of the present invention appear to be complimentary and consistent with each other. It is desirable to have LAPS identify higher-layer packets by the first four bytes rather than just the first two. Reusing the PPP protocol identifiers for LAPS, and hence matching PPP's on-the-wire packet format, has the advantage that should LAPS at some later time need to define L2 signalling, LAPS could incorporate PPP signalling by reference without having to obsolete or change LAPS itself in any way. For example, using LAPS is for some things, and PPP for others. The LAPS frame format according to the second embodiment of the invention would appear to be a more flexible selection. Vendors implementing both LAPS and PPP would be required to examine the first 4 bytes anyway and it would be better to have LAPS do the same so that vendors are not led to believe that identifying packets by the first two bytes is sufficient.

Regarding the LAPS frame format, information field is Ipv4 or Ipv6 datagram which is 32-bit based. It is good for implementation, especially for high-speed data processing if the total overhead of LAPS, including address field (single octet), control field (single octet), SAPI field (two octets) and FCS field (four octets), is also 32-bit based. In view of this, the second embodiment of the invention is developed on the basis of the first embodiment of the invention.

The change from 2-byte sequence to 4-byte sequence has been made according to the second embodiment of the invention. So <04 03 00 21> and <04 03 00 57> indicate that Ipv4 and Ipv6 are encapsulated respectively. There should not be any confusion between the use of PPP or LAPS and LAPS SAPI because the SDH VC-4 signal label (C2 byte) can be specified for PPP or LAPS and make the distinction.

Regarding FCS field, the frame format according to the second embodiment of the invention can avoid any confusion, that is the least significant FCS byte (the coefficient of the highest term) is the first inserted/transmitted FCS byte located just after the Last Information field byte. The CRC calculator is fed with the least significant (last transmitted) bit order per byte. The transmitted bits are scrambled in the order they are transmitted.

Figure 11:
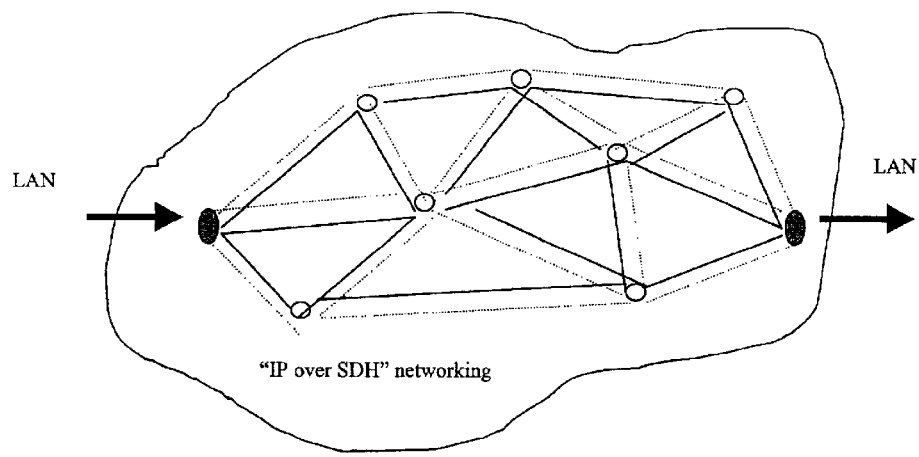
FIG. 11 is an example of the network inter-connection using IP over SDH architecture according to the present invention.

FIG. 11 is an example of the network inter-connection using IP over SDH architecture according to the present invention, wherein the solid lines indicate the SDH physical connection between nodes, dashed lines indicate the proposed packet exchange between nodes. The black nodes represent nodes at the edge of a network, acting as a gateway, and the white nodes represent backbone nodes of a network, which can overview the IP over SDH network from the viewpoint of node. It is to be emphasized that, in IP over SDH, there may be various IP over SDH physical interfaces of different rates at the links in the network, if only two peer physical interfaces in a same link have the same interfacing rate and physical parameters.

The SAPI value of present invention is variable according to the type the data received from the network layer or upper layer, it can accommodate Ipv4, Ipv6, PPP, IS-IS, Ethernet, or other type of data. For example, for MPEG data transmission, the SAPI can be assigned a value "64" or "128". The architecture of the present invention can be used to adapt IP to SDH/SONET, simplified SDH, or adapt IP to SDH, then to WDM, or PDH(pseudo SDH). For the PDH case, the encapsulated information field in the LAPS frame is bit-oriented, instead of octet-oriented.

INDUSTRIAL APPLICABILITY

It can be seen from the above description, the present invention discloses a novel data transmission apparatus and method which can be applied to core and edge routers, switch devices, IP based network accessing equipment, line cards, and interfacing units used in high speed, e.g. Gigabit applications, for adapting IP directly to SDH/SONET. This invention has the benefits such as, simple, efficient, reliable, low cost and suitable for high speed data transmission applications, especially for edge network nodes applications. The apparatus or router of the invention can be easily configured to be compatible with older equipment, such as PPP over SDH line cards or routers. The present invention can be more flexible, and better adapted to 32-bit based data transmission and processing in connection with the Internet.

Having described and illustrated the principles of the invention in the preferred embodiments thereof, it should be apparent that the invention can be modified in arrangement and detail, without departing from the spirit and scope of the invention. For example, besides SDH and SONET, the data transmission apparatus and method in transmit and/or receive direction can be applied to other physical layer devices, such as simplified SDH, pseudo-SDH, WDM, Ethernet and accommodate other network layer protocols. All these modifications and variations should fall in the scope defined in the appended claims.

What is claimed is:

1. A data transmission apparatus for transmitting data packets from a network layer side device and a physical layer side device, comprising:

a first receiving means for receiving the data packets of a certain type from the network layer side device;

SAPI identifier generating means for recognizing the type of the data packets and generating a SAPI identifier according to the recognized type; first framing means for encapsulating a SAPI field including said SAPI identifier and an information field including said data packets into a frame, to form a first type of frames;

second framing means for encapsulating said first type of frames into a payload portion, inserting appropriate overheads, to form a second type of frames; a first transmitting means for outputting said second type of frames to the physical layer side device.

2. The data transmission apparatus according to claim 1, wherein said first framing means encapsulates said data in a format of start flag, SAPI field including said SAPI identifier as address field, control field, information field including said data packets, FCS field, and end flag to form the first type of frames.

3. The data transmission apparatus according to claim 2, wherein said SAPI field is of one single octet, and said control field is of one single octet.

4. The data transmission apparatus according to claim 1, wherein said first framing means encapsulates said data in a format of start flag, address field, control field, SAPI field including said SAPI identifier, information field including said data packets, FCS field, and end flag to form the first type of frames.

5. The data transmission apparatus according to claim 4, further comprising a frame type indicator generating means for generating an indicator which indicates the type of said first type of frames, and said frame type indicator is inserted in the address field by said first framing means.

6. The data transmission apparatus according to claim 5, wherein said address field is of one single octet, said control field is of one single octet, and said SAN field is of two octets.

7. The data transmission apparatus according to claim 3, further comprising a self-synchronizing scrambling means for performing $X^{43}+1$ scrambling, said scrambling means includes a XOR gate and a 43-bit shift register, and the output bits is exclusive-ored with the raw input data bits to produce the transmitted bits.

8. The data transmission apparatus according to claim 7, further comprising a pointer inserting means for inserting pointer which indicates the start position of the payload portion in said first type of frames.

9. The data transmission apparatus according to claim 8, wherein said first receiving means is a first FIFO for receiving and buffering the input data packets.

10. The data transmission apparatus according to claim 9, wherein said start flag and end flag are "0x7E".

11. The data transmission apparatus according to claim 10, wherein said first framing means performs inter-frame fill.

12. The data transmission apparatus according to claim 11, wherein said first framing means performs transparency processing(octet stuffing) to encode 0x7E as 0x7D,0x5E, and 0x7D as 0x7D,0x5D.

13. The data transmission apparatus according to claim 12, wherein said first framing means calculates 32 bit frame check sequence field over all octets within the frame except the start flag and the end flag and the FCS field itself, with generating polynomial: $1+x+x^2+x^4+x^5+x^7+x^8+x^{10}+x^{11}+x^{12}+x^{16}+x^{22}+x^{23}+x^{26}+x^{32}$.

14. The data transmission apparatus according to claim 13, wherein said payload portion includes a plurality of sub-portions of payload for carrying said first type of frames, and the boundaries of said first type of frames are aligned with the boundaries of the payload portion.

15. The data transmission apparatus according to claim 14, wherein said SAPI generating means obtains the SAPI from the first FIFO.

16. The data transmission apparatus according to claim 3, wherein the end flag of a previous frame is the start flag of a subsequent frame next to said previous frame.

17. The data transmission apparatus according to claim 3, further comprising a packet size processing means with a preset minimum packet size (mPS) and a maximum packet size (MPS), and if a input packet is longer than the MPS or shorter than the mPS, generating a error indication.

18. The data transmission apparatus according to claim 3, further comprising a line side packet loopback means to loopback the first type of frames extracted from the second frames into the first FIFO for test purpose.

19. The data transmission apparatus according to claim 1, wherein said physical layer is one of SDH/SONET, simplified SDH/SONET, pseudo-synchronous digital hierarchy, and wavelength division multiplexing (WDM).

20. The data transmission apparatus according to claim 1, wherein said data packets from the network layer are Ipv4, Ipv6, IS-IS, PPP packets, or MPEG data stream, each corresponding to a predetermined SAPI value, respectively, and said first type of frames are LAPS frames, and the second type of frames are SDH/SONET-like frames.

21. The data transmission apparatus according to claim 14, wherein said payload portion is SPE for SDH/SONET, and virtual containers as the sub-portions of payload.

22. The data transmission apparatus according to claim 20, wherein a DS codepoint is extracted from the network layer data to control the queue algorithm.

23. The data transmission apparatus according to claim 3, wherein said SAPI field is "0x04" for Ipv4 packets, "0x06" for Ipv6 packets, and "0xff" for PPP related packets or PPP/HDLC solution.

24. The data transmission apparatus according to claim 6, wherein said address field, control field, and SAPI field are "04 03 00 21" for Ipv4 packets, "04 03 0057" for Ipv6 packets, and "ff 03 0021" for Ipv4 packet of PPP/HDLC solution.

25. A data transmission apparatus for transmitting data packets formed by encapsulating a first type of frames in a second type of frames as payload with appropriate overheads, from a physical layer side device to a network layer side device, each of said first type of frames including a SAPI field, and an information field, said apparatus comprising:
a second receiving means for receiving the data packets from the physical layer side device;
a second de-framing means for removing the overheads, and extracting the first type of frames from the payload of the second type of frames;
a first de-framing means for extracting the address field and the data contained in the information field from the first type of frames;
determining means for comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and
a second transmitting means for transmitting the extracted data packets and the determining result to the network layer side device.

26. The data transmission apparatus according to claim 25, wherein said first type of frames include start flag, address field, control field, information field including said data packets, FCS field, and end flag, and said SAPI field is at the address field.

27. The data transmission apparatus according to claim 26, wherein said SAPI field is of one single octet, and said control field is of one single octet, said SAPI is "0x04" for Ipv4 packets, "0x06" for Ipv6 packets, "0xff" for PPP/HDLC solution.

28. The data transmission apparatus according to claim 25, wherein said first type of frames include start flag, address field containing a frame type indicator, control field, SAPI field including said SAPI identifier, information field including said data packets, FCS field, and end flag to form the first type of frames.

29. The data transmission apparatus according to claim 28, wherein said address field is of one single octet, said control field is of one single octet, and said SAPI field is of two octets.

30. The data transmission apparatus according to claim 29, wherein determining means comprising a frame type recognizing means for extracting the frame type indicator from the address field to recognize the type of the first type of frames. type encapsulated in the SDH/SONET frames, if the frame type indicator is "0x04", the received frames are determined to be LAPS frames; if the frame type indicator is "0xff", the received frames are PPP frames.

31. The data transmission apparatus according to claim 30, wherein said determining means further comprising a SAPI extracting means for extracting the SAPI value from the SAPI field following the control field, if the frame type recognizing means determines the frame type indicator in the address field is "0x04", which indicates the received frames are LAPS frames, the SAPI extracting means goes to the SAPI field to extract the SAPI value, which shows the type of the data packets, i.e., "0x0021" for Ipv4 data packets, "0x0057" for Ipv6 data packets; if the frame type recognizing means determines the frame type indicator in the address field is "0xff", and the SAPI is "0021", then the received frames are determined to be PPP frames, and can be sent for further PPP processing.

32. The data transmission apparatus according to claim 31, wherein said determining means perform the determining function of the first four octets of each of the first type of frames: the address field(one octet), the control field(one octet), and the SAPI field(two octets), for facilitating 32-bit processing, the first four octets "04 03 00 21" represent Ipv4 packets, "04 03 00 57" represent Ipv6 packets, and "ff 03 00 21" represent Ipv4 of PPP/HDLC solution.

33. The data transmission apparatus according to claim 27, further comprising a descrambling means for performing $X^{43}+1$ descrambling, said de-scrambling means includes a XOR gate and a 43-bit shift register, and the output bits is exclusive-ored with the input scrambled data bits to produce the unscrambled data bits.

34. The data transmission apparatus according to claim 33, further comprising a pointer interpretation means for locating the start of the first type of frames encapsulating in the second type of frames indicated by the pointer.

35. The data transmission apparatus according to claim 34, wherein said second transmitting is a second FIFO for receiving and buffering the extracted data packets.

36. The data transmission apparatus according to claim 35, wherein said start flag and end flag are "0x7E".

37. The data transmission apparatus according to claim 36, wherein said first deframing means removes inter-frame fill.

38. The data transmission apparatus according to claim 37, wherein said first deframing means performs de-stuffing procedure to decode 0x7D,0x5E as 0x7E, and 0x7D,0x5D as 0x7D.

39. The data transmission apparatus according to claim 38, wherein the received FCS field is verified by calculating FCS checksum over all octets between the start flag and the end flag with generating polynomial: $1+x+x^2+x^4+x^5+x^7+x^8+x^{10}+x^{11}+x^{12}+x^{16}+x^{22}+x^{23}+x^{26}+x^{32}$.

40. The data transmission apparatus according to claim 39, wherein said extracted SAPI value is stored in the second FIFO.

41. The data transmission apparatus according to claim 40, wherein the end flag of a previous frame is the start flag of a subsequent frame next to said previous frame.

42. The data transmission apparatus according to claim 41, wherein said second FIFO has a preset minimum packet size(mPS) and a maximum packet size(MPS), and if a input packet is longer than the MPS or shorter than the mPS, generating a error indication.

43. The data transmission apparatus according to claim 25, wherein said physical layer is one of SDH/SONET, simplified SDH/SONET, pseudo-SDH, and wavelength division multiplexing (WDM).

44. The data transmission apparatus according to claim 25, wherein said first type of frames are LAPS frames, and the second type of frames are SDH/SONET-like frames, and said extracted data packets therefrom are Ipv4, Ipv6, IS-IS, PPP packets, or MPEG data stream.

45. The data transmission apparatus according to claim 44, further comprising a connection management unit, said connection management unit includes a timer for monitoring if the period with no frame received exceeds a preset time, and a counter for counting the expiring times of the timer, and if the counter counts to a preset value, the connection management unit determines there is a connection error, and reports to network management entity in global routing engine.

46. The data transmission apparatus according to claim 45, wherein the preset time of timer is set to 1 second, and the preset count value of the counter is set to 3 defaultly.

47. A data transmission apparatus for transmitting data packets between a network layer side device and a physical layer side device, comprising:
  a first receiving means for receiving data packets of a certain type from the network layer side device;
  SAPI identifier generating means for recognizing the type of the data packets and generating a SAPI identifier according to the recognized type;
  first framing means for encapsulating a SAPI field including said SAPI identifier and an information field including said data packets into a frame, to form a first type of frames;
  second framing means for encapsulating said first type of frames into a payload portion, inserting appropriate overheads, to form a second type of frames;
  a first transmitting means for outputting said second type of frames to the physical layer side device;
  a second receiving means for receiving data packets from the physical layer side device;
  a second de-framing means for removing the overheads, and extracting the first type of frames from the payload of the second type of frames;
  a first de-framing means for extracting the address field and the data contained in the information field from the first type of frames;
  determining means for comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and
  a second transmitting means for transmitting the extracted data packets and the determining result to the network layer side device.

48. The data transmission apparatus according to claim 47, further comprising an embedded CPU for performing the processes involved in the first framing means and the first de-framing means.

49. The data transmission apparatus according to claim 48, further comprising a network layer processor, said network layer processor includes a PPP processing unit for either performing PPP(LCP,NCP) processing or transferring PPP packet to global routing engine on the data transmitted from said second FIFO, when said determining means determines that the SAPI indicates that the received packets is PPP packets and need to be further processed.

50. A router device comprising a plurality of line cards, and at least one of the line cards includes:
  a first receiving means for receiving data packets of a certain type from the network layer side device;
  SAPI identifier generating means for recognizing the type of the data packets and generating a SAPI identifier according to the recognized type;
  first framing means for encapsulating a SAPI field including said SAPI identifier and an information field including said data packets into a frame, to form a first type of frames;
  second framing means for encapsulating said first type of frames into a payload portion, inserting appropriate overheads, to form a second type of frames;
  a first transmitting means for outputting said second type of frames to the physical layer side device;
  a second receiving means for receiving data packets from the physical layer side device;
  a second de-framing means for removing the overheads, and extracting the first type of frames from the payload of the second type of frames;
  a first de-framing means for extracting the address field and the data contained in the information field from the first type of frames;
  determining means for comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and
  a second transmitting means for transmitting the extracted data packets and the determining result to the network layer side device.

51. The router according to claim 50, wherein said at least one line card further comprises an embedded CPU for performing the processes involved in the first frame means and the first de-framing means.

52. The router according to claim 51, wherein said at least one line card further comprises a network layer processor, said network layer processor includes a PPP processing unit for either performing PPP(LCP,NCP) processing or transferring PPP packet to global routing engine on the data transmitted from said second FIFO, when said determining means determines that the SAPI indicates that the received packets is PPP packets and need to be further processed.

53. The router device according to claim 52, further comprising a global CPU for both routing engine and network management in each of the line cards.

54. A data transmission method for transmitting data packets from a network layer side device and a physical layer side device, comprising the steps of: receiving the data packets of a certain type from the network layer side device; recognizing the type of the data packets and generating a SAPI identifier according to the recognized type;
   first framing step, for encapsulating a SAPI field including said SAPI identifier and an information field including said data packets into a frame, to form a first type of frames;
   second framing step, for encapsulating said first type of frames into a payload portion, inserting appropriate overheads, to form a second type of frames; and outputting said second type of frames to the physical layer side device.

55. The data transmission method according to claim 54, wherein said first framing step encapsulates said data in a format of start flag, SAM field including said SAM identifier as the address field, control field, information field including said data packets, FCS field, and end flag to form the first type of frames.

56. The data transmission method according to claim 55, wherein said SAPI field is of one single octet, and said control field is of one single octet.

57. The data transmission method according to claim 54, wherein said first framing step encapsulates said data in a format of start flag, address field, control field, SAPI field including said SAPI identifier, information field including said data packets, FCS field, and end flag to form the first type of frames.

58. The data transmission method according to claim 57, further comprising a frame type indicator generating step for generating an indicator which indicates the type of said first type of frames, and said frame type indicator is inserted in the address field in said first framing step.

59. The data transmission method according to claim 58, wherein said address field is of one single octet, said control field is of one single octet, and said SAPI field is of two octets.

60. The data transmission method according to claim 56, further comprising a self-synchronizing scrambling step for performing X43+1 scrambling on the transmitted first type of frames.

61. The data transmission method according to claim 60, wherein said start flag and end flag are "0x7E".

62. The data transmission method according to claim 61, wherein in said first framing step inter-frame fill is performed and FIFO error recovery is transmitted.

63. The data transmission method according to claim 62, wherein said first framing step performs transparency processing(octet stuffing) to encode 0x7E as 0x7D,0x5E, and 0x7D as 0x7D,0x5D.

64. The data transmission method according to claim 63, wherein said first framing step calculates 32 bit frame check sequence field over all octets within the frame except the start flag and the end flag and the FCS field itself, with generating polynomial: $1+x+x^2+x^4+x^5+x^7+x^8+x^{10}+x^{11}+x^{12}+x^{16}+x^{22}+x^{23}+x^{26}+x^{32}$.

65. The data transmission method according to claim 64, wherein the end flag of a previous frame is the start flag of a subsequent frame next to said previous frame.

66. The data transmission method according to claim 65, wherein said input data packets are buffered for rate adaptation before being processed.

67. The data transmission method according to claim 54, wherein said physical layer is one of SDH/SONET, simplified SDH/SONET, pseudo-synchronous digital hierarchy, and wavelength division multiplexing (WDM).

68. The data transmission method according to claim 54, wherein said data packets from network layer are Ipv4, Ipv6, IS-IS, PPP packets, or MPEG data stream, each corresponding to a predetermined SAPI value, respectively, and said first type of frames are LAPS frames, and the second type of frames are SDH/SONET-like frames.

69. The data transmission method according to claim 56, wherein said SAPI field is "0x04" for Ipv4 packets, "0x06" for Ipv6 packets, and "0xff" for PPP/HDLC solution.

70. The data transmission method according to claim 59, wherein said address field, control field, and SAPI field are "04 03 00 21" for Ipv4 packets, "04 03 0057" for Ipv6 packets, and "ff 03 0021" for Ipv4 packet of PPP/HDLC solution.

71. A data transmission method for transmitting data packets formed by encapsulating a first type of frames in a second type of frames as payload with appropriate overheads, from a physical layer side device to a network layer side device, each of said first type of frames including a SAPI field, and an information field, said method comprising the steps of:
   receiving the data packets from the physical layer side device;
   second de-framing step, for removing the overheads, and extracting the first type of frames from the payload of the second type of frames;
   first de-framing step, for extracting the SAPI field and the data contained in the information field from the first type of frames;
   comparing the value of the SAPI field with a set of preset values including at least a first value and a second value, and if the value of the SAPI field data matches the first value, determining the extracted data is of a first type, and if the value of the SAPI field matches the second value, determining the extracted data is of a second type; and transmitting the extracted data packets and the determining result to the network layer side device.

72. The data transmission method according to claim 71, wherein said first type of frames include start flag, address field, control field, information field including said data packets, FCS field, and end flag, and said SAPI field is at the address field.

73. The data transmission method according to claim 72, wherein said SAPI field is of one single octet, and said control field is of one single octet, said SAPI is "0x04" for Ipv4 packets, "0x06" for Ipv6 packets, "0xff" for PPP/HDLC solution.

74. The data transmission method according to claim 71, wherein said first type of frames include start flag, address field containing a frame type indicator, control field, SAPI field including said SAPI identifier, information field including said data packets, FCS field, and end flag to form the first type of frames.

75. The data transmission method according to claim 74, wherein said address field is of one single octet, said control field is of one single octet, and said SAPI field is of two octets.

76. The data transmission method according to claim 75, wherein said comparing and determining step comprising a frame type recognizing step for extracting the frame type indicator from the address field to recognize the type of the first type of frames. type encapsulated in the SDH/SONET frames, if the frame type indicator is "0x04", the received frames are determined to be LAPS frames; if the frame type indicator is "0xff", the received frames are PPP frames.

77. The data transmission method according to claim 76, wherein said comparing and determining step further comprising a SAPI extracting means for extracting the SAPI value from the SAPI field following the control field, if the frame type recognizing means determines the frame type indicator in the address field is "0x04", which indicates the received frames are LAPS frames, the SAPI extracting means goes to the SAPI field to extract the SAPI value, which shows the type of the data packets, i.e., "0x0021" for Ipv4 data packets, "0x0057" for Ipv6 data packets; if the frame type recognizing means determines the frame type indicator in the address field is "0xff", and the SAPI is "0021", then the received frames are determined to be PPP frames, and can be sent for further PPP processing.

78. The data transmission apparatus according to claim 76, wherein said comparing and determining step perform the determining function of the first four octets of each of the first type of frames: the address field(one octet), the control field(one octet), and the SAPI field(two octets), for facilitating 32-bit processing, the first four octets "04 03 00 21" represent Ipv4 packets, "04 03 00 57" represent Ipv6 packets, and "ff 03 00 21" represent corresponding PPP solution.

79. The data transmission method according to claim 73, further comprising a descrambling step for performing $X^{43}+1$ descrambling to produce the unscrambled bits.

80. The data transmission method according to claim 79, wherein said start flag and end flag are "0x7E".

81. The data transmission method according to claim 80, wherein said first de-framing step removes inter-frame fill.

82. The data transmission method according to claim 81, wherein said first de-framing step performs de-stuffing procedure to decode 0x7D,0x5E as WE, and 0x7D,0x5D as 0x7D.

83. The data transmission method according to claim 82, wherein the received FCS field is verified by calculating FCS checksum over all octets between the start flag and the end flag with generating polynomial: $1+x+x^2+x^4+x^5+x^7+x^8+x^{10}+x^{11}+x^{12}+x^{16}+x^{22}+x^{23}+x^{26}+x^{32}$.

84. The data transmission method according to claim 83, wherein the end flag of a previous frame is the start flag of a subsequent frame next to said previous frame.

85. The data transmission method according to claim 84, wherein the output data packets are buffered for rate adaptation before being transmitted to network layer.

86. The data transmission method according to claim 71, wherein said physical layer is one of SDH/SONET, simplified SDH/SONET, pseudo-synchronous digital hierarchy, and wavelength division multiplexing (WDM).

87. The data transmission method according to claim 71, wherein said first type of frames are LAPS frames, and the second type of frames are SDH/SONET-like frames, and said extracted data packets therefrom are Ipv4, Ipv6, IS-IS, PPP packets, or MPEG data stream.

* * * * *